(12) United States Patent
Baldemair et al.

(10) Patent No.: US 12,301,396 B2
(45) Date of Patent: *May 13, 2025

(54) CONTROL SIGNALING FOR WIRELESS COMMUNICATION NETWORK

(71) Applicant: Telefonaktiebolaget LM Ericsson (publ), Stockholm (SE)

(72) Inventors: Robert Baldemair, Solna (SE); Mattias Frenne, Uppsala (SE); Stefan Parkvall, Bromma (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/262,839

(22) PCT Filed: Jan. 28, 2021

(86) PCT No.: PCT/SE2021/050057
§ 371 (c)(1),
(2) Date: Jul. 25, 2023

(87) PCT Pub. No.: WO2022/164359
PCT Pub. Date: Aug. 4, 2022

(65) Prior Publication Data
US 2024/0089159 A1    Mar. 14, 2024

(51) Int. Cl.
*H04L 27/26* (2006.01)
*H04L 5/00* (2006.01)

(52) U.S. Cl.
CPC ...... *H04L 27/26035* (2021.01); *H04L 5/0048* (2013.01); *H04L 27/26134* (2021.01); *H04L 27/2636* (2013.01)

(58) Field of Classification Search
CPC .. H04B 1/7117; H04B 7/0417; H04B 7/0639; H04B 1/707; H04B 7/0634;
(Continued)

(56) References Cited

U.S. PATENT DOCUMENTS 9,072,086 B2    6/2015  Papasakellariou et al.
2011/0096657 A1   4/2011  Luo et al.
(Continued)

FOREIGN PATENT DOCUMENTS

EP    2357735 A2    8/2011
WO    2017167384 A1   10/2017

OTHER PUBLICATIONS

International Search Report and Written Opinion dated Oct. 25, 2021 for International Application No. PCT/SE2021/050057 filed Jan. 28, 2021, consisting of 9-pages.
(Continued)

*Primary Examiner* — Eva Y Puente
(74) *Attorney, Agent, or Firm* — Weisberg I.P. Law, P.A.

(57) ABSTRACT

There is disclosed a method of operating a transmitting radio node in a wireless communication network. The method includes transmitting first control signaling covering one or more first allocation units in a control transmission time
(Continued)

interval, and transmitting second control signaling covering one or more second allocation units in the control transmission time interval, wherein the second control signaling is shifted relative to the first control signaling, and wherein the second control signaling is shifted relative to the first control signaling based on a complex conjugation operation. The disclosure also pertains to related devices and methods.

19 Claims, 4 Drawing Sheets

(58) Field of Classification Search
CPC .. H04B 1/7075; H04B 7/2628; H04B 1/1036; H04L 27/26; H04L 27/2657; H04L 25/0204; H04L 27/2636; H04L 27/2662; H04L 27/2602; H04L 27/2621; H04L 25/021; H04W 72/21; H04W 48/16; H04W 64/00; H04W 52/42; H04W 74/0833; H04W 28/18; H04W 48/08; H04W 72/04; H04W 72/046
USPC ........................................................ 375/262
See application file for complete search history.

(56) References Cited

U.S. PATENT DOCUMENTS

| | | | | |
|---|---|---|---|---|
| 2014/0254515 | A1* | 9/2014 | Kim ................... | H04B 7/088 370/329 |
| 2019/0261327 | A1* | 8/2019 | Hosseini ............... | H04W 72/23 |
| 2024/0089935 | A1* | 3/2024 | Baldemair ............ | H04L 5/0053 |

OTHER PUBLICATIONS

International Search Report and Written Opinion dated Nov. 2, 2021 for International Application No. PCT/SE2021/050058 filed Jan. 28, 2021, consisting of 12-pages.
3GPP RAN WG1 LTE Ad Hoc R1-061753; Title: Preamble design for non-synchronized RACH in LTE; Agenda Item: 4.1; Source: SHRCWC, RITT; Document for: Discussion and decision; Date and Location: Jun. 27-30, 2006, Cannes, France, consisting of 7-pages.
3GPP TSG RAN WG1 Meeting #49bis R1-073072; Title: Uplink Data-non-associated Control Signaling in E-UTRA; Agenda Item: 5.13.2; Source: KDDI; Document for: Discussion and Decision; Date and Location: Jun. 25-29, 2007, Orlando, USA, consisting of 5-pages.

* cited by examiner

CONTROL SIGNALING FOR WIRELESS COMMUNICATION NETWORK

CROSS-REFERENCE TO RELATED APPLICATIONS

This application is a Submission Under 35 U.S.C. § 371 for U.S. National Stage Patent Application of International Application Number: PCT/SE2021/050057, filed Jan. 28, 2021 entitled "CONTROL SIGNALING FOR WIRELESS COMMUNICATION NETWORK," the entirety of which is incorporated herein by reference.

TECHNICAL FIELD

This disclosure pertains to wireless communication technology, in particular for high frequencies.

BACKGROUND

For future wireless communication systems, use of higher frequencies is considered, which allows large bandwidths to be used for communication. However, use of such higher frequencies brings new problems, for example regarding physical properties and timing. Ubiquitous or almost ubiquitous use of beamforming, with often comparatively small beams, may provide additional complications that need to be addressed.

SUMMARY

It is an object of this disclosure to provide improved approaches of handling wireless communication, in particular regarding control signaling. The approaches described are particularly suitable for millimeter wave communication, in particular for radio carrier frequencies around and/or above 52.6 GHz, which may be considered high radio frequencies (high frequency) and/or millimeter waves. The carrier frequency/ies may be between 52.6 and 140 GHz, e.g. with a lower border between 52.6, 55, 60, 71 GHz and/or a higher border between 71, 72, 90, 114, 140 GHz or higher, in particular between 55 and 90 GHz, or between 60 and 72 GHz; however, higher frequencies may be considered, in particular frequency of 71 GHz or 72 GHz or above, and/or 100 GHz or above, and/or 140 GHz or above. The carrier frequency may in particular refer to a center frequency or maximum frequency of the carrier. The radio nodes and/or network described herein may operate in wideband, e.g. with a carrier bandwidth of 1 GHz or more, or 2 GHz or more, or even larger, e.g. up to 8 GHz; the scheduled or allocated bandwidth may be the carrier bandwidth, or be smaller, e.g. depending on channel and/or procedure. In some cases, operation may be based on an OFDM waveform or a SC-FDM waveform (e.g., downlink and/or uplink), in particular a FDF-SC-FDM-based waveform. However, operation based on a single carrier waveform, e.g. SC-FDE (which may be pulse-shaped or Frequency Domain Filtered, e.g. based on modulation scheme and/or MCS), may be considered for downlink and/or uplink. In general, different waveforms may be used for different communication directions. Communicating using or utilising a carrier and/or beam may correspond to operating using or utilising the carrier and/or beam, and/or may comprise transmitting on the carrier and/or beam and/or receiving on the carrier and/or beam. Operation may be based on and/or associated to a numerology, which may indicate a subcarrier spacing and/or duration of an allocation unit and/or an equivalent thereof, e.g., in comparison to an OFDM based system. A subcarrier spacing or equivalent frequency interval may for example correspond to 960 kHZ, or 1920 kHz, e.g. representing the bandwidth of a subcarrier or equivalent.

The approaches are particularly advantageously implemented in a future 6th Generation (6G) telecommunication network or 6G radio access technology or network (RAT/RAN), in particular according to 3GPP (3rd Generation Partnership Project, a standardisation organization). A suitable RAN may in particular be a RAN according to NR, for example release 18 or later, or LTE Evolution. However, the approaches may also be used with other RAT, for example future 5.5G systems or IEEE based systems.

There is generally described a method of operating a transmitting radio node in a wireless communication network. The method comprises transmitting first control signaling covering one or more first allocation units in a control transmission time interval, and transmitting second control signaling covering one or more second allocation units in the control transmission time interval, wherein the second control signaling is shifted relative to the first control signaling. The second control signaling is shifted relative to the first control signaling based on a complex conjugation operation.

A transmitting radio node for a wireless communication network may be considered. The transmitting radio node is adapted for transmitting first control signaling covering one or more first allocation units in a control transmission time interval, and transmitting second control signaling covering one or more second allocation units in the control transmission time interval, wherein the second control signaling is shifted relative to the first control signaling. The second control signaling is shifted relative to the first control signaling based on a complex conjugation operation.

Moreover, a method of operating a receiving radio node in a wireless communication network is described. The method comprises communicating based on received control signaling, the control signaling comprising first control signaling covering one or more first allocation units in a control transmission time interval, the control signaling further comprising second control signaling covering one or more second allocation units in the control transmission time interval, wherein the second control signaling is shifted relative to the first control signaling. The second control signaling is shifted relative to the first control signaling based on a complex conjugation operation.

A receiving radio node for a wireless communication network is further disclosed. The receiving radio node is adapted for communicating based on received control signaling. The control signaling comprises first control signaling covering one or more first allocation units in a control transmission time interval. The control signaling further comprises second control signaling covering one or more second allocation units in the control transmission time interval. The second control signaling is shifted relative to the first control signaling. The second control signaling is shifted relative to the first control signaling based on a complex conjugation operation.

It may be considered that the first control signaling and/or the second control signaling is signaling on a physical control channel and/or a physical broadcast channel, and/or comprises such. Control signaling comprising signaling on a physical broadcast channel (PBCH) may comprise synchronisation signaling, e.g. PSS and/or SSS. Thus, transmission diversity may be provided for such channels.

It may be considered that the first control signaling and the second control signaling represent the same information content and/or payload; it may be considered that the second control signaling represents a copy or payload copy or content copy of the first control signaling. Repeated transmission of the control signalings (e.g., pairwise) may be considered, to provide more than two copies, e.g. over time, e.g. according to an aggregation level.

In general, the first control signaling may comprise first reference signaling, and the second control signaling may comprise second reference signaling. The second control signaling may be shifted relative to the first control signaling at least such that the second reference signaling is shifted relative to the first reference signaling. The first reference signaling and/or second reference signaling may in particular be no demodulation reference signaling (e.g., DMRS) and/or phase-tracking reference signaling (e.g., PT-RS) or timing reference signaling, e.g. associated to signaling on a physical control channel. In some cases, the reference signaling may be PSS or SSS, e.g. for control signaling on a broadcast channel associated to synchronisation signaling. The reference signaling in general may be specific to the control signaling, and/or be intended for receiving and/or demodulating and/or decoding the payload.

In general, control signaling may carry and/or represent a payload, e.g. one or more bits of information. In some cases, the control signaling may carry and/or represent additional error (e.g., detection) coding bits, e.g. for CRC. It may be considered that in some variants the control signaling is not associated to error correction coding (e.g., FEC), and/or not subject to an acknowledgement signaling process. This facilitates low latency operation. In general, first and second control signaling may have the same format, e.g. the same PDCCH format or DCI format, or the same PSCCH or SCI format. The format may correspond to a signaling sequence, e.g. for short or "quick" control signaling transmissions, e.g. such that the sequence represents a predefined or configured or configurable bit combination (the sequence may be from a set of sequences, each of which may represent a different bit combination). In other cases, the format may represent a container, which may contain a plurality of bit fields (e.g., predefined and/or configured or configurable bit fields).

It may generally be considered that the first control signaling and/or the second control signaling are associated to first synchronisation signaling. In this context, they may be associated such that they fulfill one or more QCL (Quasi-CoLocation) parameters regarding the first synchronisation signaling, e.g. appear as QCL for a receiver; in particular, one or more channel conditions for QCL transmissions may be the same for a receiver, which may for example not be able to distinguish between different transmission sources, treating them as being essentially the same. QCL parameter/s may comprise one or more of path delay and/or delay spread and/or path-loss (e.g., in terms of power) and/or signal spread. Control signaling may be associated to first synchronisation signaling if the signaling carrying payload and/or associated reference signaling is associated, e.g. shows QCL characteristic. Thus, homogenous reception of the control signalings may be facilitated.

It may be considered that the first control signaling and the second control signaling are synchronised to each other. In particular, they may start and/or end at the same times, and/or have allocation units with coinciding borders in time domain. The control transmission time interval may correspond to a number CT of allocation units in time domain; both first and second control signaling may extend over the CT allocation units. Simultaneous transmission of the first and second control signaling may be effected. The synchronisation may be provided by the transmitting radio node, which may e.g. transmit the signalings accordingly. The first and second allocation units may be considered to represent the same time domain intervals; as they may be considered to be attached or associated to different transmissions or transmission structures, they may be considered separate. However, in some perspectives (e.g., considering synchronisation), the first allocation units may be considered the same as the second allocation units. In some variants, the first and/or second allocation units may represent and/or contain and/or correspond to only one allocation unit, e.g. for a short control signaling transmission, or two or less, or four or less allocation units. Each of the first and/or second control signaling may correspond to one transmission or occurrence of the payload, or to several, e.g. consecutive in time domain and/or frequency domain (e.g., mapped such that parts of two occurrences are mapped to the same allocation unit, but different subcarriers or PRBs).

In general, the second control signaling may overlap and/or coincide in time and/or frequency domain with the first control signaling. An overlap may be total (the same extension in time and/or frequency domain) or partial.

It may be considered that the second control signaling may be shifted relative to the first control signaling by having a different mapping of bits and/or modulation symbols to resources. Resources may in particular be time and/or frequency resources, in particular subcarriers (e.g., in the same time interval corresponding to an allocation unit) and/or resource elements and/or resource blocks or other resource structure/s. This facilitates simple processing, e.g. to achieve suitable pseudo-orthogonality.

In some variants, the second control signaling may be shifted relative to the first control signaling by being scrambled by a different scrambling code and/or being subject to a different interleaving function and/or being subject to a different cyclic shift, in particular in frequency and/or time domain, and/or representing a different redundancy version of encoded bits and/or being subject to different scrambling of error coding, and/or based on time domain interleaving and/or frequency domain interleaving. For example, a CRC as error coding may be scrambled with different IDs, e.g. different RNTIs, which may be configured to the receiving radio node.

In general, the second control signaling may have a different transmission source than the first control signaling. A transmission source may in particular comprise and/or be represented by an antenna or group of antenna elements or antenna subarray or antenna array or transmission point or TRP or antenna port. Different transmission sources may in particular comprise different and/or separately controllable antenna element/s or (sub-)arrays. In particular, analog beamforming may be used, with separate analog control of the different transmission sources.

In general, the control signaling may be downlink control signaling, e.g. provided by the network (transmitting radio node) to a wireless device (receiving radio node). In some cases, e.g. a sidelink scenario, it may be sidelink control signaling, or backhaul control signaling in a backhaul scenario.

The approaches described may allow utilising transmission diversity for control signaling, in particular for downlink control signaling, with low signaling overhead and utilising transmission diversity. With transmission diversity, improved signaling quality for synchronisation signaling may be achieved. Shifting second control signaling may be such potential destructive interference of the control signalings at the receiver is minimised, providing good signaling quality, e.g. facilitating soft combining and/or allowing low PAPR. A receiver (e.g., a receiving radio node) may receive either or both of the control signalings, e.g. (soft-) combine them, or only use one if the signal strength and/or quality is sufficient.

In general, it may be considered transmitting the same PDCCH (or PBCH or PSCCH) payload from two Tx antennas (in particular, on overlapping resources like overlapping time/frequency resources), in particular modified so that the two transmission are sufficiently different as to avoid destructive combining at the two signals in the channel, observed at the receiver. Two DMRS antenna ports may be used, e.g., one per antenna, to assist the UE acquiring coherent channel knowledge. The receiver may receive two "copies" of the payload (e.g., PDCCH or PBCH or PSCCH), it can then choose to receive one if spatial diversity is not needed, or to receive both and combine them do obtain Tx diversity, e.g. by soft combining. The difference may be achieved by introducing pseudo-orthogonality, e.g. with the second control signaling being shifted relative to the first control signaling. In particular, a different scrambling code $c\_n$ for each payload copy (e.g., PDCCH copy), in particular for bits or modulated symbols may be used, e.g. to provide $b\_n$. $c\_n=y\_n$. $y\_n$ may generally represent the scrambled and transmitted bit/symbol sequence and/or the sequence mapped to subcarriers and/or a time sequence, $b\_n$ may represent the input bit/symbol sequence (e.g., representing the payload). Alternatively, or additionally, a different interleaver f (e.g., time domain interleaver and/or frequency domain interleaver) of encoded bits or modulated symbols may be used for each copy, e.g. $y\_n=f(b\_n)$. More alternatively, or additionally, a different cyclic shift in frequency or time domain of bits or modulated symbols for each payload copy like PDCCH copy may be considered. Even more alternatively, or additionally, different sets of encoded bits e.g. using different RVs (Redundancy Version) may be used for each of the PDCCHs. The different sets my represent and/or be based on the same payload and/or information bits, e.g. with different number and/or arrangement of error coding bits, e.g. CRC and/or FEC bits; a redundancy version may indicate a starting point for bits to map in a circular representation or buffer. Bits and/or modulation symbols representing bits may be mapped to subcarriers (e.g. of one allocation unit) and/or into time domain, e.g. different allocation units and/or a time domain sequence within an allocation unit, e.g. depending on the waveform used.

The approaches can be interpreted to provide a rank 2 transmission with one control signaling like PDCCH per layer, but with repetition of the same DCI payload in each control signaling or payload copy, e.g. PDCCH copy.

It should be noted that the control transmission time interval may represent one occurrence or incidence of control signaling; there may be multiple control signaling occurrences over longer time intervals, e.g. periodically or aperiodically, for example to provide an aggregation level A corresponding to repeated transmissions (e.g., $A=N*2$, with N being the number of occurrences, and 2 representing the transmission of the first and second control signalings at each occurrence). In general, between different types or groups of synchronisation signaling may be neighbouring to each other within the synchronisation time interval, e.g. without allocation units providing guard time (and/or empty allocation units in the synchronisation time interval).

In general, second control signaling may be shifted in at least one allocation unit (e.g., the signalings may be synchronised, but shifted within an allocation unit). Shifting may be for a plurality or all of the allocation units in the control transmission time interval. Thus, for shifted allocation units, diversity may be provided. For not-shifted allocation units, signaling parameters may be saved (e.g., due to limitations for shifting parameters).

It may be considered that the second control signaling may be shifted via cyclic shifting and/or ramping, e.g. in time domain and/or frequency domain and/or phase domain. A parameter for cyclic shift and/or ramping may be discontinuous, e.g. represented or representable by an integer and/or an integer multiple of a parameter like pi and/or a phase parameter or time parameter or frequency parameter. The shifting may be per (or within an) allocation unit and/or bandwidth. In particular, it may be considered that time domain shifting, e.g. cyclic shifting, may be on signals and/or symbols within an allocation unit, such that an allocation unit may define the time domain interval of shifting (or similar for frequency domain, in particular regarding the utilised bandwidth, which may be the same for each allocation unit of specific type of signaling; different types may use the same or different bandwidths).

In general, format and/or information content of the first control signaling may be the same as information content of the second control signaling, e.g. for a control information message on a control channel, e.g. PDCCH or PSSCH, or for broadcast signaling, e.g. on a PBCH. The information content may in particular comprise and/or represent a scheduling assignment, or scheduling grant, or a combined grant scheduling both downlink and uplink transmissions, e.g. on data channels like PDCCH and PUSCH, or PSSCHs (in two directions).

It may be considered that the first control signaling and second control signaling may be synchronised. For example, allocation units and/or borders in time domain may coincide (e.g., within an allowable time difference for synchronisation). The transmitting radio node may be adapted to perform such synchronisation, e.g. based on a clock like a system clock, or a synchronisation signal, which may be received from another source, e.g. a satellite system or earth-bound transmitter or the network it is connected to. The receiving radio node may synchronise to the control signaling and/or a transmission timing used by the transmitting radio node.

It may be considered that for each allocation unit of first control signaling (e.g., covered by and/or carrying such), the second control signaling may comprise shifted control signaling. Thus, all of the control signaling may be shifted.

The transmitting radio node may in general comprise, and/or be adapted to utilise, processing circuitry and/or radio circuitry, in particular a transmitter and/or transceiver, to process (e.g., trigger and/or schedule) and/or transmit control signaling. The transmitting radio node may in particular be a network node or base station, and/or a network radio node; it may be implemented as an IAB or relay node. In general, the transmitting radio node may comprise and/or be adapted for transmission diversity, and/or may be connected or connectable to, and/or comprise, antenna circuitry, and/or two or more independently operable or controllable antenna arrays or arrangements, and/or transmitter circuitries and/or antenna circuitries, and/or may be adapted to use (e.g., simultaneously) a plurality of antenna ports (e.g., for transmitting control signaling and/or associated reference signaling, in particular first and second control signaling), e.g. controlling transmission using the antenna array/s. The transmitting radio node may comprise multiple components and/or transmitters and/or TRPs (and/or be connected or connectable thereto) and/or be adapted to control transmission from such. Any combination of units and/or devices able to control transmission on an air interface and/or in radio as described herein may be considered a transmitting radio node.

The receiving radio node may comprise, and/or be adapted to utilise, processing circuitry and/or radio circuitry, in particular a receiver and/or transmitter and/or transceiver, to receive and/or process (e.g. receive and/or demodulate and/or decode and/or perform blind detection and/or schedule or trigger such) control signaling. Receiving may comprise scanning a frequency range (e.g., a carrier) for control signaling, e.g. at specific (e.g., predefined and/or configured) locations in time/frequency domain, which may be dependent on the carrier and/or system bandwidth. Such location/s may correspond to one or more search spaces and/or CORESETs, e.g. for control signaling on a control channel, or to a location of synchronisation signaling or other signaling comprising signaling on a broadcast channel like PBCH. The receiving radio node may in particular be a wireless device like a terminal or UE. However, in some cases, e.g. IAB or relay scenarios or multiple-RAT scenarios, it may be network node or base station, and/or a network radio node, for example an IAB or relay node. The receiving radio node may comprise one or more independently operable or controllable receiving circuitries and/or antenna circuitries and/or may be adapted to receive two or more control signalings, e.g. the first and second control signaling, simultaneously and/or to operate using two or more antenna ports simultaneously, and/or may be connected and/or connectable and/or comprise multiple independently operable or controllable antennas or antenna arrays or subarrays.

A signaling sequence of an allocation unit may be based on the root sequence based on a code, which may represent a shift or operation on the root sequence to provide the signaling sequence; the signaling sequence may be based on such shifted or processed or operated on root sequence. The code may in particular represent a cyclic shift and/or phase shift and/or phase ramp (e.g., an amount for such). The code may assign one operation or shift for each allocation unit.

In general, a signaling sequence associated to an allocation unit (and/or the allocation units) associated to control signaling (and/or reference signaling) may be based on a root sequence which may be a M-sequence or Zadoff-Chu sequence, or a Gold or Golay sequence, or another sequence with suitable characteristics regarding correlation and/or interference (e.g., self-interference and/or interference with other or neighboring transmitters). Different sequences may be used as root sequences for different signaling sequences, or the same sequence may be used. If different sequences are used, they may be of the same type (Gold, Golay, M- or Zadoff-Chu, for example). The (signaling and/or root) sequences may correspond to or be time-domain sequences, e.g. time domain Zadoff-Chu and/or time-domain M sequences. An M-sequence may represent and/or comprise and/or be based on codes/codepoints and/or elements +1, −1. +j, −j, e.g. for QPSK modulation. In some cases, an M-sequence may represent and/or be based on N cyclic shift per symbol (N=4 or 8, for example), in particular in the context of pi/2 BPSK modulation.

It may be considered that signaling sequences associated to different allocation units are based on an orthogonalisation code and/or a cyclic shift and/or phase shift or phase ramping of a root sequence. Thus, a root sequence may be used in different ways multiple times. In general, the shifts may be different for each allocation unit, such that no sequence is exactly the same. A cyclic shift may be in frequency domain in particular for SC-FDM or OFDM based system (e.g., for SC-FDM, before DFT-spreading).

It may be considered that the signaling sequences are from a set of sequences, and/or a root sequence is from a set of sequences. The set of sequences may comprise a limited set of sequences, which may be assigned to different transmitting radio nodes, e.g. over a geographic or logical area. This allows distinction of different transmitters and/or cells.

In general, the number of available sequences of a type with suitable characteristics like length and/or correlation and/or interference (e.g., Zadoff-Chu and/or M-sequence) is limited (such may represent a set of sequences), using shifted versions of a root sequence facilitates providing cell and/or transmitter identity information without having to use to many sequences per transmitter. Thus, a sufficiently large number of different cells and/or transmitter may be identified.

It may be considered that signaling sequences associated to allocation units associated to the first control signaling and/or the second control signaling are based the same Zadoff-Chu sequence and/or M-sequence, which may be shifted between allocation units. This provides signaling sequences with good correlation characteristics.

Control signaling and/or synchronisation signaling may be received from (and/or transmitted by) a transmitting radio node. The (e.g., first and/or second) control signaling and/or synchronisation signaling may in general be transmitted in a beam (e.g., different beams for first and second control signaling); the beam may be swept and/or switched to cover different directions. Signaling may be transmitted repeatedly during switching or sweeping the beam, the beam may be pointed in a direction to transmit into that direction one or more occasions and/or bursts of the synchronisation signaling. Communicating with a network or network node based on received control signaling may comprise and/or be represented by receiving the signaling and/or performing measurement/s on the signaling and/or synchronising based on received synchronisation signaling and/or determining signal quality and/or strength based on the received signaling and/or performing random access (accessing the cell and/or transmitting radio node) based on synchronisation signaling and/or providing measurement information (e.g., for cell selection and/or reselection) and/or identifying the cell ID and/or transmitter ID represented by received synchronisation signaling and/or transmitting data and/or receiving data based on the control signaling, in particular in a data channel like PUSCH or PDSCH or PSSCH. It may be assumed that the receiving node may be informed about transmission characteristics like a power level and/or bandwidth of synchronisation signaling and/or control signaling, e.g. based on received SI and/or based on a standard.

The control transmission time interval may represent a time interval in which the first and/or second control signaling is transmitted (or received, respectively); the control transmission time interval may span (e.g., encompass and/or include and/or comprise and/or consist of) NS allocation units, wherein NS may for example be 1 or more, or 2 or more, or 4 or more. Allocation units may carry components of the control signaling, e.g. PSS and/or SSS and/or PBCH (if the control signaling represents SS/PBCH block signaling) and/or signaling of a physical control channel like PDCCH or PSCCH and/or reference signaling like DMRS, and/or may be empty, e.g. functioning as guard interval and/or gap. Allocation units carrying control signaling may be in a block, e.g. such that each allocation unit carrying control signaling in the control transmission time interval is neighbored to at least one allocation unit in time domain also carrying control signaling, and/or only two allocation units (border units in time) carrying control signaling (e.g., a component) have only one neighboring allocation unit carrying control signaling (e.g., a component), if the control transmission time interval is longer than one allocation unit.

An allocation unit may be considered to be associated to control signaling if it carries at least a component of the control signaling (e.g., a component of control signaling is transmitted on the allocation unit). In particular, an allocation unit may be considered to be associated to a control channel or broadcast channel if it carries one or more bits of the channel and/or associated error coding, and/or such is transmitted in the allocation unit. An allocation unit may in particular represent a time interval, e.g. a block symbol or the duration of a SC-FDM symbol, or OFDM symbol or equivalent, and/or may be based on the numerology used for the synchronisation signaling, and/or may represent a predefined time interval. The duration (in time domain) of an allocation unit may be associated to a bandwidth in frequency domain, e.g. a subcarrier spacing or equivalent, e.g. a minimum usable bandwidth and/or a bandwidth allocation unit. It may be considered that signaling spanning an allocation unit corresponds to the allocation unit (time interval) carrying the signaling and/or signaling being transmitted (or received) in the allocation unit. Transmission of signaling and reception of signaling may be related in time by a path travel delay the signaling requires to travel from the transmitter to receiver (it may be assumed that the general arrangement in time is constant, with path delay/multi path effects having limited effect on the general arrangement of signaling in time domain). Allocation units associated to different control signalings, e.g. first control signaling and second control signaling, may be considered to be associated to each other and/or correspond to each other if they correspond to the same number of allocation unit within a control transmission time interval, and/or if they are synchronised to each other and/or are simultaneous, e.g. in two simultaneous transmissions. Similar reasoning may pertain to a control transmission time interval; the same interval for two signalings may be the intervals having the same number and/or relative location in the frame or timing structure associated to each signaling.

It may be considered that each of the allocation units spanned by the (e.g., first and/or second) control signaling, there is associated a signaling sequence. A signaling sequence may correspond to a sequence of modulation symbols (e.g., in time domain, after DFT-spreading for a SC-FDM system, or in frequency domain for an OFDM system). The signaling sequence may be predefined.

Signaling sequences of the control signaling associated to different allocation units may be different. For example, they may be based on different (root) sequences, e.g. different M-sequences or other sequences. Alternatively, or additionally, different sequences may be based on the same root sequence, e.g. the same M-sequence, wherein different signaling sequences may represent the same root sequence differently processed, e.g. shifted, and/or cyclically shifted and/or phase-shifted, and/or based on, and/or operated on with, a code, e.g. cover code or barker code. Thus, signaling diversity is provided, allowing improved reception.

It may be considered that two or more allocation units carry the same signaling sequence; in some cases, the signaling sequence of at least one allocation unit is different from the other/s, e.g. based on a code like a barker code and/or an orthogonal cover code. In this case, the elements of the barker code (e.g. of a 4-element code) may be considered to be applied each to a different allocation unit, e.g., providing same length signaling sequences on the different allocation units.

In general, signaling sequences of (e.g., first and/or second) control signaling associated to different allocation units may be based on the same root sequence (e.g., an M-sequence or ZC sequence). However, it may be considered that more than one root sequence is used, e.g. such that signaling sequences associated to different allocation units may be based on different root sequences.

A signaling sequence associated to an allocation unit may be composed and/or constructed of, and/or based on, a plurality of composite (or component) sequences, wherein the composite (or component) sequences may be based on the same sequence, e.g. the same root sequence. The signaling sequences may be combined to provide coverage of a synchronisation bandwidth, e.g. such that the subcarriers of the bandwidth each carry a symbol of the sequence (or that at least 90% or at least 95% or 98% of the subcarriers carry a symbol). A cyclic extension and/or cutting off may be considered.

In some cases, signaling sequences associated to different allocation units may be based on an orthogonalisation code and/or barker code. This facilitates signaling diversity and/or allows distinction over signaling from neighboring cells or transmitters.

It may be considered that the signaling sequences are from a set of sequences, e.g. a limited set. It may be assumed that each transmitter of a network uses sequences from the set, allowing consistent but distinguishable behaviour within the network.

In some variant, a signaling sequence may be based on an M-sequence or Golay sequence or Gold sequence, which facilitates interference limitation in particular with other signaling associated to other cells and/or transmitters.

It may be considered that a signaling sequence associated to an allocation unit is based on a barker code. The barker code may be applied to a root sequence, such that a number of repetitions of the root sequence corresponding and/or equal to the number of elements of the barker code (e.g., 4, leading to 3 repetitions and in total 4 occasions of the (processed) root sequence or 4 component or composite sequences) are combined to provide the sequence. It may be considered that a signaling sequence associated to an allocation unit constructed from a (short) root sequence to provide a longer sequence (e.g., around or at least as long as the number of elements of the barker code, e.g. 4, times the number of elements of the root sequence. In this case, the elements of the barker code may be considered to be applied to one allocation unit only, e.g., to provide a signaling sequence longer than the root sequence. It may be considered that barker coding is used both to provide a signaling sequence of an allocation unit from a shorter root sequence, and to provide signaling sequences on different allocation units with the same length, e.g. based on the signaling sequence corresponding to a construction based on the barker code to provide the signaling sequence from the shorter root sequence. Different barker codes may be used for the different purposes, to avoid self-interference. It should be noted that there are 2 barker codes of length 4 (with 4 elements), as indicated below. Instead of barker code/s, different codes may be used, to provide suitable orthogonality and/or interference avoidance and/or correlation characteristics.

In general, a signaling sequence may comprise a and/or may be based on a cyclic extension. This allows easy representation or construction, while maintaining desired characteristics when extending or expanding is needed, e.g. to cover a desired frequency bandwidth.

A code may cover the number of allocation units carrying control signaling, e.g. such that the sequence associated to an allocation unit is based on an element of the code, e.g. a matrix or vector element of a code. In general, a barker code of length 4 (e.g., for control signaling spanning 4 allocation units, and/or for a signaling sequence having 4 composite sequences) may have the form of [1 1 1 −1] or [1 1 −1 1]. In general, composite sequences of a sequence may be based on a root sequence and/or a code; in this case, the code may map sequence elements within an (the same) allocation unit. Alternatively, or additionally, a time distribution of sequences may be based on a root sequence and/or a code. In this case, the code may map a sequence or sequence element from one allocation unit to one or more other allocation units.

A sequence may generally be considered to be based on a root sequence if it can be constructed from the root sequence, e.g. by shifting in phase and/or frequency and/or time, and/or performing a cyclic shift and/or a cyclic extension, and/or copying/repeating and/or processing or operating on with a code. A cyclic extension of a sequence may comprise taking a part of the sequence (in particular a border part like a tail or beginning) and appending it to the sequence, e.g. at the beginning or end, for example in time domain or frequency domain. Thus, a cyclic extended sequence may represent a (root) sequence and at least a part repetition of the (root) sequence. Operation described may be combined, in any order, in particular a shift and a cyclic extension. A cyclic shift in a domain may comprise shifting the sequence in the domain within an interval, such that the total number of sequence elements is constant, and the sequence is shifted as if the interval represented a ring (e.g., such that starting from the same sequence element, which may appear at different location in the interval), the order of elements is the same if the borders of the intervals are considered to be continuous, such that leaving one end of the interval leads to entering the interval at the other end). Processing and/or operating on with a code may correspond to constructing a sequence out of copies of a root sequence, wherein each copy is multiplied and/or operated on with an element of the code. Multiplying with an element of a code may represent and/or correspond to a shift (e.g., constant or linear or cyclic) in phase and/or frequency and/or time domain, depending on representation. In the context of this disclosure, a sequence being based on and/or being constructed and/or processed may be any sequence that would result from such construction or processing, even if the sequence is just read from memory. Any isomorphic or equivalent or corresponding way to arrive at the sequence is considered to be included by such terminology; the construction thus may be considered to define the characteristics of the sequence and/or the sequence, not necessarily a specific way to construct them, as there may be multiple equivalent ways that are mathematically equivalent. Thus, a sequence "based on" or "constructed" or similar terminology may be considered to correspond to the sequence being "represented by" or "may be represented by" or "representable as".

A root sequence for a signaling sequence associated to one allocation unit may be basis for construction of a larger sequence. In this case, the larger sequence and/or the root sequence basis for its construction may be considered root sequence for signaling sequences associated to other allocation units.

For OFDM or SC-FDM, each element of a signaling sequence or modulation symbol sequence may be mapped to a subcarrier; in general, for SC-based signaling, a corresponding mapping in time domain may be utilised (such that each element may use essentially the full synchronisation bandwidth). A signaling sequence may comprise (ordered) modulation symbols, each modulation symbol representing a value of the sequence it is based on, e.g. based on the modulation scheme used and/or in a phase or constellation diagram; for some sequences like Zadoff-Chu sequences, there may be a mapping between non-integer sequence elements and transmitted waveform, which may not be represented in the context of a modulation scheme like BPSK or QPSK or higher.

There is also described a program product comprising instructions causing processing circuitry to control and/or perform a method as described herein.

Moreover, a carrier medium arrangement carrying and/or storing a program product as described herein is considered. An information system comprising, and/or connected or connectable, to a radio node is also disclosed.

BRIEF DESCRIPTION OF THE DRAWINGS

The drawings are provided to illustrate concepts and approaches described herein, and are not intended to limit their scope. The drawings comprise.

DETAILED DESCRIPTION

Figure 1:
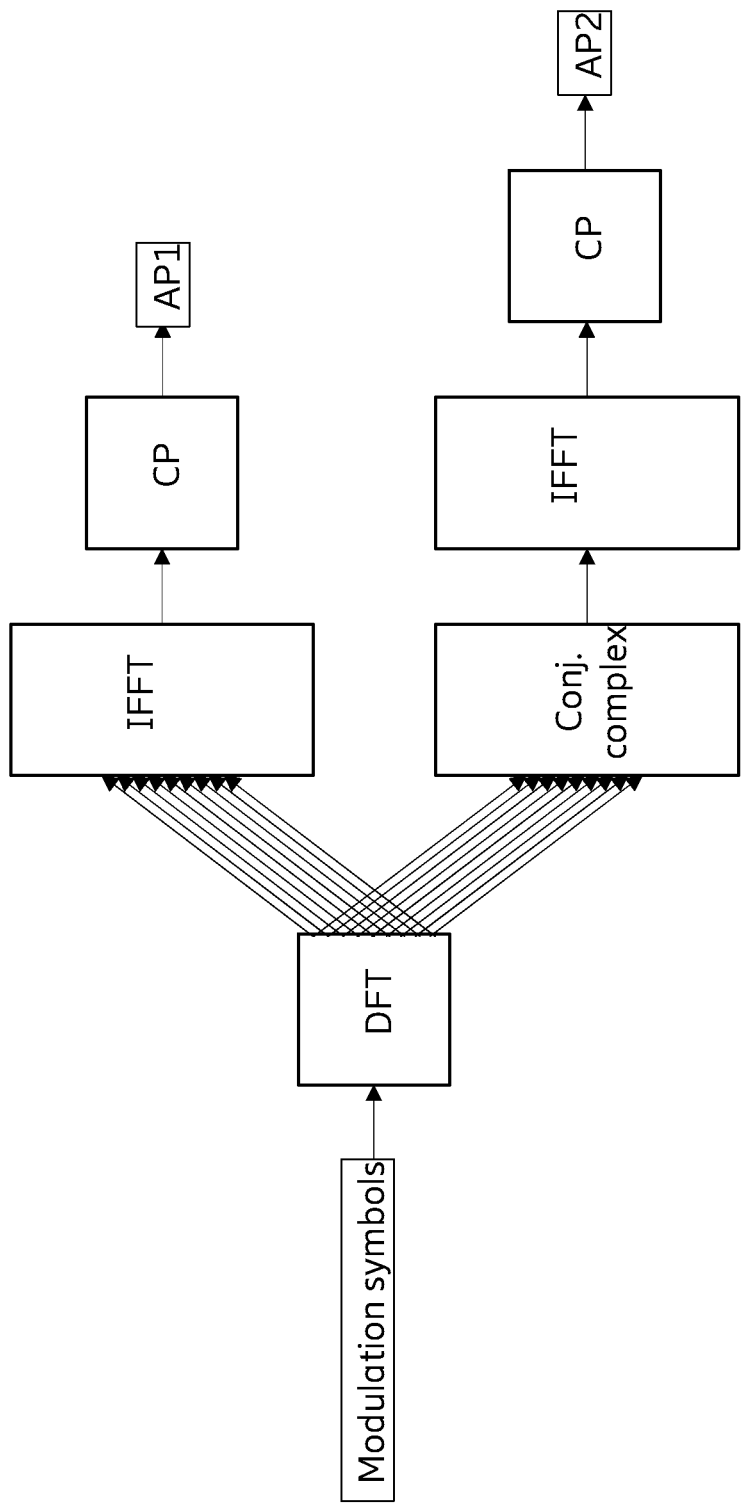
FIG. 1, showing an exemplary shifting approach.

FIG. 1 shows an exemplary approach of transmitting first control signaling (transmitted on first transmission source AP1) and second control signaling (transmitted on second transmission source AP2). Modulation symbols (e.g., in a sequence) representing the control signaling (and/or the content), e.g. based on modulating bits representing the control signaling content, may be provided to a DFT unit. The DFT unit may be adapted to perform a DFT on the modulation symbols (e.g., spreading the symbols). From the DFT unit, the spread symbols may be provided to different processing branches associated to AP1 and AP2, respectively, e.g. in a frequency domain representation. In the branch associated to AP1 (first branch), a IFFT unit adapted to perform an inverse FFT of the DFT-spread symbols (the output of the DFT unit) may be considered to provide signaling samples for transmission. A CP unit may be adapted to add a cyclic prefix (or other form of suffix) to the signaling samples. In the second branch, there may be arranged a conjugation unit Conj. Complex adapted to perform a complex conjugate operation on the input received from the DFT unit, before passing this on as output to the IFFT unit associated to the second branch. A second CP unit may be arranged in the second branch, adapted to add a cyclic prefix (or other form of suffix) to the signaling samples received from the second IFFT unit. An optional frequency domain interleaver may be arranged in the second branch, or in the first branch, e.g. behind the DFT unit and/or before the IFFT unit, in particular between the DFT unit and the conjugation unit, or behind the conjugation unit. The DFT unit may be implemented as part of both branches, or separate from either or one of the branches. In this variant, only one DFT unit may be necessary. The transmission sources AP1, AP2 may be adapted to transmit the signaling samples with CP, representing the first and second control signaling, received from the associated CP units. The second control signaling may be shifted relative to the first signaling due to the action of the conjugation unit and/or an interleaver, e.g. for providing transmission diversity.

Figure 2:
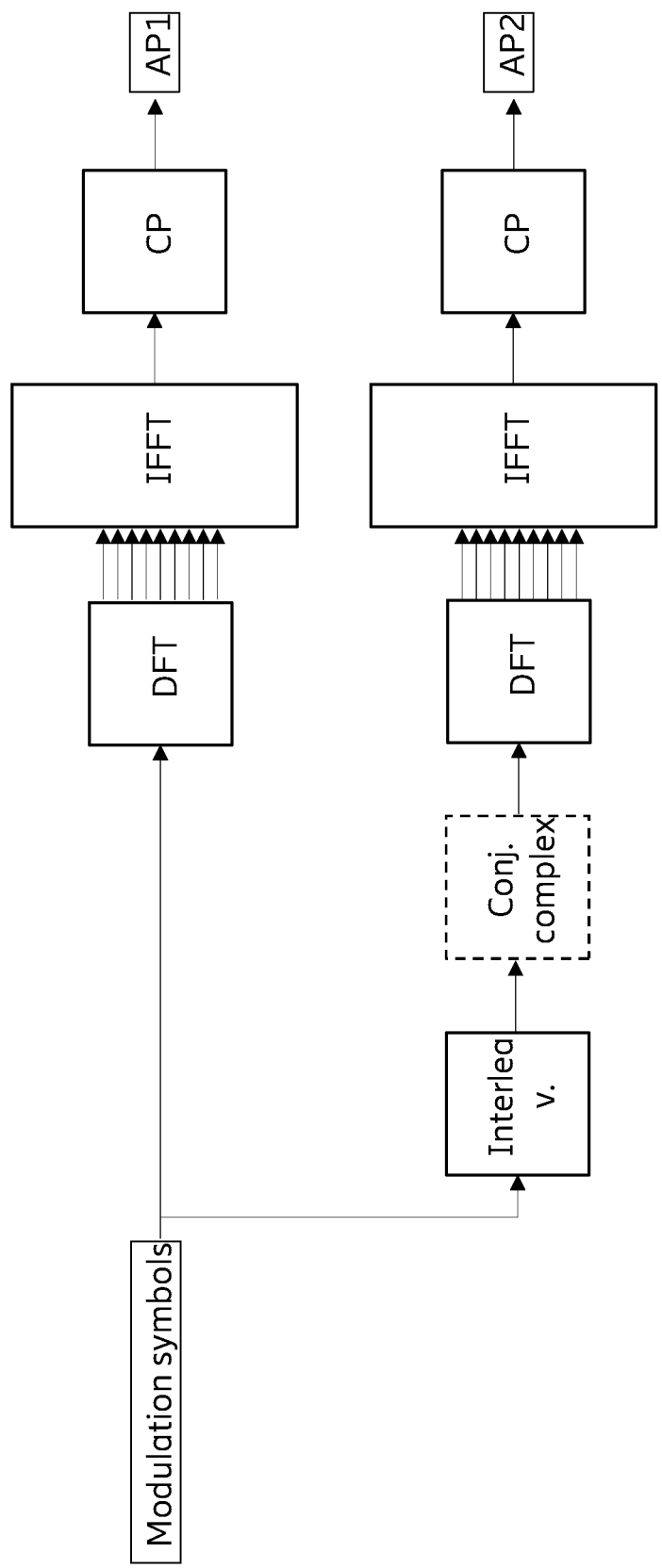
FIG. 2, showing another exemplary shifting approach.

FIG. 2 shows an exemplary approach of transmitting first control signaling (transmitted on first transmission source AP1) and second control signaling (transmitted on second transmission source AP2). Modulation symbols (e.g., in a sequence) representing the control signaling (and/or the content), e.g. based on modulating bits representing the control signaling content, may be provided to different processing branches. The branches may process, as input, the same sequence and/or copies of the same sequence. Different branches may lead to the different transmission sources AP1, AP2. Each branch may comprise a DFT unit adapted to perform a DFT on the modulation symbols (e.g., spreading the symbols). In each branch, an IFFT unit may be provided, which may be adapted to perform an inverse FFT of an input like DFT-spread symbols (e.g., the output of the DFT unit) to provide signaling samples for transmission. A CP unit of each branch may be adapted to add a cyclic prefix (or other form of suffix) to received signaling samples. The second branch, associated to AP2, may comprise an optional time-domain interleaver Interleav., e.g. arranged in the branch before the DFT unit; however, in some cases, it may be behind the DFT unit, and/or a frequency domain interleaver may be used (e.g., instead or in combination with the time-domain interleaver, for example behind a DFT unit). In one variant, there may be provided a conjugation unit Conj. Complex to perform a complex conjugate operation on the input (e.g., the modulation symbol sequence or a time domain permutation thereof, if a time domain interleaver is used), before passing this on as output to the IFFT unit associated to the second branch. The transmission sources AP1, AP2 may be adapted to transmit the signaling samples with CP, representing the first and second control signaling. In some alternatives, the interleaver may be arranged in the first branch, while the conjugation unit may be arranged in the second branch, e.g. to homogenise processing times between the branches.

A time domain interleaver may in general be adapted to permutate an input sequence, e.g. a modulation symbol sequence, in time domain, e.g. change the order of the modulation symbol sequence provided as input to the time domain interleaver. In some cases, a time reversal (e.g., reversal of the order of the elements/symbols of the sequence) may be considered an exemplary form of time domain interleaving. Other form may be considered, e.g. exchanging the order pairwise, e.g. of neighbouring elements or of non-neighbouring elements, and/or exchanging elements block-wise; exchanging in this case may refer to exchanging the location and/or order of elements of the input sequence, e.g., without introducing new elements (which were not elements of the input sequence).

A frequency domain interleaver may in general be adapted to permutate an input sequence, e.g. subcarrier mapping of a modulation symbol sequence, in frequency domain, e.g. change the order of a modulation symbol sequence mapped to subcarriers provided as input to the interleaver. In some cases, a frequency domain reversal (e.g., reversal of the order of the elements/symbols of the sequence on the subcarriers) may be considered an exemplary form of frequency domain interleaving. Other form may be considered, e.g. exchanging the order pairwise, e.g. of neighbouring elements or of non-neighbouring elements, and/or exchanging elements block-wise; exchanging in this case may refer to exchanging the location and/or order of elements of the input sequence, e.g., without introducing new elements (which were not elements of the input sequence).

In general, the output of an interleaver, e.g., a time domain interleaver or frequency domain interleaver, may represent, and/or comprise and/or consist of, a permutation of the input to the interleaver; in some cases, padding or cyclic extension may be provided, e.g. to fill up the required input samples or elements for a unit following behind in the branch, e.g. for an IFFT unit.

Performing a complex conjugate operation may in general pertain to determining and/or outputting the complex conjugate of one or more elements or samples of input, e.g. of a modulation symbol in time domain or mapped to frequency domain, e.g. to a subcarrier. All, or a subset of, input elements or samples may be subject to such an operation. A conjugation unit may in general be adapted to perform a complex conjugate operation. In some cases, padding or cyclic extension may be provided, e.g. to fill up the required input samples or elements for a unit following behind in the branch, e.g. for an IFFT unit.

It may be considered that the indicated order of interleaver and conjugation unit may be reversed, for example such that in the example of FIG. 2, the conjugation unit may be before the time domain interleaver.

Transmission sources may for example be implemented as, and/or may comprise and/or represent, TRPs, or antenna arrangements and/or antenna ports. Examples of FIGS. 1 and 2 may be considered exemplary processing circuitries and/or radio circuitries for a transmitting radio node; the transmission sources may be considered implemented as part of such, and/or to comprise, and/or be connected or connectable to, antenna circuitry and/or an antenna arrangement. A receiving radio node may be adapted to perform reverse (receiving operation) in an analogous manner. Each unit may be considered as part of circuitry, or as separate circuitry adapted for suitable communication with other unit/s, and/or may comprise hardware and/or software and/or firmware, and/or may be considered as and/or to comprise integrated circuitry. Functionality associated to a unit may be combined with functionality associated to another unit, e.g. in a unit providing the combined functionality. Before and behind in a branch may refer to the processing order and/or data or signaling flow; behind may also be referred to as downstream, before as upstream.

In general, first control signaling may be considered shifted relative to second control signaling based on a complex conjugate operation if such an operation has been performed to determine and/or transmit and/or shape the first and/or second control signaling, e.g. on modulation symbols and/or samples representing the information content of the signaling, in particular in on or more processing actions and/or units (e.g., a conjugation unit) for providing the control signaling. Other forms of shifting may be included, e.g. for the signaling subject to a complex conjugate operation; such shifting may for example comprise interleaving, e.g. in time domain or frequency domain.

In general, control signaling may be based on a complex conjugate operation if during processing of modulation symbols into samples for transmission and/or to transmit the control signaling, a complex conjugate operation has been performed and/or is to be performed. Control signaling may be based on an interleaving operation if during processing of modulation symbols into samples for transmission and/or to transmit the control signaling, an interleaving operation has been performed and/or is to be performed.

In general, the second control signaling may be based on performing complex conjugation and an interleaving operation, e.g. in the same branch, and/or processing modulation symbols for transmission of the second control signaling.

However, in some variants, the first control signaling may be based on an interleaving operation, and the second control signaling may be based on a complex conjugation operation.

Figure 3:
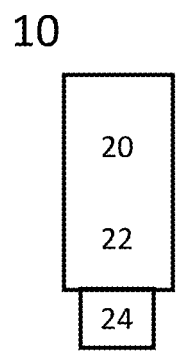
FIG. 3, showing an exemplary (e.g., receiving) radio node.

FIG. 3 schematically shows a radio node, in particular a wireless device or terminal 10 or a UE (User Equipment). Radio node 10 comprises processing circuitry (which may also be referred to as control circuitry) 20, which may comprise a controller connected to a memory. Any module of the radio node 10, e.g. a communicating module or determining module, may be implemented in and/or executable by, the processing circuitry 20, in particular as module in the controller. Radio node 10 also comprises radio circuitry 22 providing receiving and transmitting or transceiving functionality (e.g., one or more transmitters and/or receivers and/or transceivers), the radio circuitry 22 being connected or connectable to the processing circuitry. An antenna circuitry 24 of the radio node 10 is connected or connectable to the radio circuitry 22 to collect or send and/or amplify signals. Radio circuitry 22 and the processing circuitry 20 controlling it are configured for cellular communication with a network, e.g. a RAN as described herein, and/or for sidelink communication (which may be within coverage of the cellular network, or out of coverage; and/or may be considered non-cellular communication and/or be associated to a non-cellular wireless communication network). Radio node 10 may generally be adapted to carry out any of the methods of operating a radio node like terminal or UE disclosed herein; in particular, it may comprise corresponding circuitry, e.g. processing circuitry, and/or modules, e.g. software modules. It may be considered that the radio node 10 comprises, and/or is connected or connectable, to a power supply.

Figure 4:
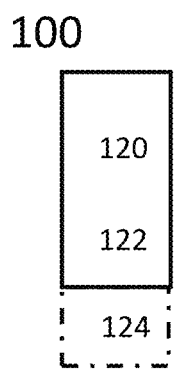
FIG. 4, showing another exemplary (e.g., transmitting) radio node.

FIG. 4 schematically show a radio node 100, which may in particular be implemented as a network node 100, for example an eNB or gNB or similar for NR. Radio node 100 comprises processing circuitry (which may also be referred to as control circuitry) 120, which may comprise a controller connected to a memory. Any module, e.g. transmitting module and/or receiving module and/or configuring module of the node 100 may be implemented in and/or executable by the processing circuitry 120. The processing circuitry 120 is connected to control radio circuitry 122 of the node 100, which provides receiver and transmitter and/or transceiver functionality (e.g., comprising one or more transmitters and/or receivers and/or transceivers). An antenna circuitry 124 may be connected or connectable to radio circuitry 122 for signal reception or transmittance and/or amplification. Node 100 may be adapted to carry out any of the methods for operating a radio node or network node disclosed herein; in particular, it may comprise corresponding circuitry, e.g. processing circuitry, and/or modules. The antenna circuitry 124 may be connected to and/or comprise an antenna array. The node 100, respectively its circuitry, may be adapted to perform any of the methods of operating a network node or a radio node as described herein; in particular, it may comprise corresponding circuitry, e.g. processing circuitry, and/or modules. The radio node 100 may generally comprise communication circuitry, e.g. for communication with another network node, like a radio node, and/or with a core network and/or an internet or local net, in particular with an information system, which may provide information and/or data to be transmitted to a user equipment.

In general, a block symbol may represent and/or correspond to an extension in time domain, e.g. a time interval. A block symbol duration (the length of the time interval) may correspond to the duration of an OFDM symbol or a corresponding duration, and/or may be based and/or defined by a subcarrier spacing used (e.g., based on the numerology) or equivalent, and/or may correspond to the duration of a modulation symbol (e.g., for OFDM or similar frequency domain multiplexed types of signaling). It may be considered that a block symbol comprises a plurality of modulation symbols, e.g. based on a subcarrier spacing and/or numerology or equivalent, in particular for time domain multiplexed types (on the symbol level for a single transmitter) of signaling like single-carrier based signaling, e.g. SC-FDE or SC-FDMA (in particular, FDF-SC-FDMA or pulse-shaped SC-FDMA). The number of symbols may be based on and/or defined by the number of subcarrier to be DFTS-spread (for SC-FDMA) and/or be based on a number of FFT samples, e.g. for spreading and/or mapping, and/or equivalent, and/or may be predefined and/or configured or configurable. A block symbol in this context may comprise and/or contain a plurality of individual modulation symbols, which may be for example 1000 or more, or 3000 or more, or 3300 or more. The number of modulation symbols in a block symbol may be based and/or be dependent on a bandwidth scheduled for transmission of signaling in the block symbol. A block symbol and/or a number of block symbols (an integer smaller than 20, e.g. equal to or smaller than 14 or 7 or 4 or 2 or a flexible number) may be a unit (e.g., allocation unit) used or usable or intended e.g. for scheduling and/or allocation of resources, in particular in time domain. To a block symbol (e.g., scheduled or allocated) and/or block symbol group and/or allocation unit, there may be associated a frequency range and/or frequency domain allocation and/or bandwidth allocated for transmission.

An allocation unit, and/or a block symbol, may be associated to a specific (e.g., physical) channel and/or specific type of signaling, for example reference signaling. In some cases, there may be a block symbol associated to a channel that also is associated to a form of reference signaling and/or pilot signaling and/or tracking signaling associated to the channel, for example for timing purposes and/or decoding purposes (such signaling may comprise a low number of modulation symbols and/or resource elements of a block symbol, e.g. less than 10% or less than 5% or less than 1% of the modulation symbols and/or resource elements in a block symbol). To a block symbol, there may be associated resource elements; a resource element may be represented in time/frequency domain, e.g. by the smallest frequency unit carrying or mapped to (e.g., a subcarrier) in frequency domain and the duration of a modulation symbol in time domain. A block symbol may comprise, and/or to a block symbol may be associated, a structure allowing and/or comprising a number of modulation symbols, and/or association to one or more channels (and/or the structure may dependent on the channel the block symbol is associated to and/or is allocated or used for), and/or reference signaling (e.g., as discussed above), and/or one or more guard periods and/or transient periods, and/or one or more affixes (e.g., a prefix and/or suffix and/or one or more infixes (entered inside the block symbol)), in particular a cyclic prefix and/or suffix and/or infix. A cyclic affix may represent a repetition of signaling and/or modulation symbol/s used in the block symbol, with possible slight amendments to the signaling structure of the affix to provide a smooth and/or continuous and/or differentiable connection between affix signaling and signaling of modulation symbols associated to the content of the block symbol (e.g., channel and/or reference signaling structure). In some cases, in particular some OFDM-based waveforms, an affix may be included into a modulation symbol. In other cases, e.g. some single carrier-based waveforms, an affix may be represented by a sequence of modulation symbols within the block symbol. It may be considered that in some cases a block symbol is defined and/or used in the context of the associated structure.

Communicating may comprise transmitting or receiving. It may be considered that communicating like transmitting signaling is based on a SC-FDM based waveform, and/or corresponds to a Frequency Domain Filtered (FDF) DFTS-OFDM waveform. However, the approaches may be applied to a Single Carrier based waveform, e.g. a SC-FDM or SC-FDE-waveform, which may be pulse-shaped/FDF-based. It should be noted that SC-FDM may be considered DFT-spread OFDM, such that SC-FDM and DFTS-OFDM may be used interchangeably. Alternatively, or additionally, the signaling (e.g., first signaling and/or second signaling) and/or beam/s (in particular, the first received beam and/or second received beam) may be based on a waveform with CP or comparable guard time. The received beam and the transmission beam of the first beam pair may have the same (or similar) or different angular and/or spatial extensions; the received beam and the transmission beam of the second beam pair may have the same (or similar) or different angular and/or spatial extensions. It may be considered that the received beam and/or transmission beam of the first and/or second beam pair have angular extension of 20 degrees or less, or 15 degrees or less, or 10 or 5 degrees or less, at least in one of horizontal or vertical direction, or both; different beams may have different angular extensions. An extended guard interval or switching protection interval may have a duration corresponding to essentially or at least N CP (cyclic prefix) durations or equivalent duration, wherein N may be 2, or 3 or 4. An equivalent to a CP duration may represent the CP duration associated to signaling with CP (e.g., SC-FDM-based or OFDM-based) for a waveform without CP with the same or similar symbol time duration as the signaling with CP. Pulse-shaping (and/or performing FDF for) a modulation symbol and/or signaling, e.g. associated to a first subcarrier or bandwidth, may comprise mapping the modulation symbol (and/or the sample associated to it after FFT) to an associated second subcarrier or part of the bandwidth, and/or applying a shaping operation regarding the power and/or amplitude and/or phase of the modulation symbol on the first subcarrier and the second subcarrier, wherein the shaping operation may be according to a shaping function. Pulse-shaping signaling may comprise pulse-shaping one or more symbols; pulse-shaped signaling may in general comprise at least one pulse-shaped symbol.

Pulse-shaping may be performed based on a Nyquist-filter. It may be considered that pulse-shaping is performed based on periodically extending a frequency distribution of modulation symbols (and/or associated samples after FFT) over a first number of subcarrier to a larger, second number of subcarriers, wherein a subset of the first number of subcarriers from one end of the frequency distribution is appended at the other end of the first number of subcarriers.

In some variants, communicating may be based on a numerology (which may, e.g., be represented by and/or correspond to and/or indicate a subcarrier spacing and/or symbol time length) and/or an SC-FDM based waveform (including a FDF-DFTS-FDM based waveform) or a single-carrier based waveform. Whether to use pulse-shaping or FDF on a SC-FDM or SC-based waveform may depend on the modulation scheme (e.g., MCS) used. Such waveforms may utilise a cyclic prefix and/or benefit particularly from the described approaches. Communicating may comprise and/or be based on beamforming, e.g. transmission beamforming and/or reception beamforming, respectively. It may be considered that a beam is produced by performing analog beamforming to provide the beam, e.g. a beam corresponding to a reference beam. Thus, signaling may be adapted, e.g. based on movement of the communication partner. A beam may for example be produced by performing analog beamforming to provide a beam corresponding to a reference beam. This allows efficient postprocessing of a digitally formed beam, without requiring changes to a digital beamforming chain and/or without requiring changes to a standard defining beam forming precoders. In general, a beam may be produced by hybrid beamforming, and/or by digital beamforming, e.g. based on a precoder. This facilitates easy processing of beams, and/or limits the number of power amplifiers/ADC/DCA required for antenna arrangements. It may be considered that a beam is produced by hybrid beamforming, e.g. by analog beamforming performed on a beam representation or beam formed based on digital beamforming. Monitoring and/or performing cell search may be based on reception beamforming, e.g. analog or digital or hybrid reception beamforming. The numerology may determine the length of a symbol time interval and/or the duration of a cyclic prefix. The approaches described herein are particularly suitable to SC-FDM, to ensure orthogonality, in particular subcarrier orthogonality, in corresponding systems, but may be used for other waveforms. Communicating may comprise utilising a waveform with cyclic prefix. The cyclic prefix may be based on a numerology, and may help keeping signaling orthogonal. Communicating may comprise, and/or be based on performing cell search, e.g. for a wireless device or terminal, or may comprise transmitting cell identifying signaling and/or a selection indication, based on which a radio node receiving the selection indication may select a signaling bandwidth from a set of signaling bandwidths for performing cell search.

A beam or beam pair may in general be targeted at one radio node, or a group of radio nodes and/or an area including one or more radio nodes. In many cases, a beam or beam pair may be receiver-specific (e.g., UE-specific), such that only one radio node is served per beam/beam pair. A beam pair switch or switch of received beam (e.g., by using a different reception beam) and/or transmission beam may be performed at a border of a transmission timing structure, e.g. a slot border, or within a slot, for example between symbols Some tuning of radio circuitry, e.g. for receiving and/or transmitting, may be performed. Beam pair switching may comprise switching from a second received beam to a first received beam, and/or from a second transmission beam to a first transmission beam. Switching may comprise inserting a guard period to cover retuning time; however, circuitry may be adapted to switch sufficiently quickly to essentially be instantaneous; this may in particular be the case when digital reception beamforming is used to switch reception beams for switching received beams.

A reference beam may be a beam comprising reference signaling, based on which for example a of beam signaling characteristics may be determined, e.g. measured and/or estimated. A signaling beam may comprise signaling like control signaling and/or data signaling and/or reference signaling. A reference beam may be transmitted by a source or transmitting radio node, in which case one or more beam signaling characteristics may be reported to it from a receiver, e.g. a wireless device. However, in some cases it may be received by the radio node from another radio node or wireless device. In this case, one or more beam signaling characteristics may be determined by the radio node. A signaling beam may be a transmission beam, or a reception beam. A set of signaling characteristics may comprise a plurality of subsets of beam signaling characteristics, each subset pertaining to a different reference beam. Thus, a reference beam may be associated to different beam signaling characteristics.

A beam signaling characteristic, respectively a set of such characteristics, may represent and/or indicate a signal strength and/or signal quality of a beam and/or a delay characteristic and/or be associated with received and/or measured signaling carried on a beam. Beam signaling characteristics and/or delay characteristics may in particular pertain to, and/or indicate, a number and/or list and/or order of beams with best (e.g., lowest mean delay and/or lowest spread/range) timing or delay spread, and/or of strongest and/or best quality beams, e.g. with associated delay spread. A beam signaling characteristic may be based on measurement/s performed on reference signaling carried on the reference beam it pertains to. The measurement/s may be performed by the radio node, or another node or wireless device. The use of reference signaling allows improved accuracy and/or gauging of the measurements. In some cases, a beam and/or beam pair may be represented by a beam identity indication, e.g. a beam or beam pair number. Such an indication may be represented by one or more signaling sequences (e.g., a specific reference signaling sequences or sequences), which may be transmitted on the beam and/or beam pair, and/or a signaling characteristic and/or a resource/s used (e.g., time/frequency and/or code) and/or a specific RNTI (e.g., used for scrambling a CRC for some messages or transmissions) and/or by information provided in signaling, e.g. control signaling and/or system signaling, on the beam and/or beam pair, e.g. encoded and/or provided in an information field or as information element in some form of message of signaling, e.g. DCI and/or MAC and/or RRC signaling.

A reference beam may in general be one of a set of reference beams, the second set of reference beams being associated to the set of signaling beams. The sets being associated may refer to at least one beam of the first set being associated and/or corresponding to the second set (or vice versa), e.g. being based on it, for example by having the same analog or digital beamforming parameters and/or precoder and/or the same shape before analog beamforming, and/or being a modified form thereof, e.g. by performing additional analog beamforming. The set of signaling beams may be referred to as a first set of beams, a set of corresponding reference beams may be referred to as second set of beams.

In some variants, a reference beam and/or reference beams and/or reference signaling may correspond to and/or carry random access signaling, e.g. a random access preamble. Such a reference beam or signaling may be transmitted by another radio node. The signaling may indicate which beam is used for transmitting. Alternatively, the reference beams may be beams receiving the random access signaling. Random access signaling may be used for initial connection to the radio node and/or a cell provided by the radio node, and/or for reconnection. Utilising random access signaling facilitates quick and early beam selection. The random access signaling may be on a random access channel, e.g. based on broadcast information provided by the radio node (the radio node performing the beam selection), e.g. with synchronisation signaling (e.g., SSB block and/or associated thereto). The reference signaling may correspond to synchronisation signaling, e.g. transmitted by the radio node in a plurality of beams. The characteristics may be reported on by a node receiving the synchronisation signaling, e.g. in a random access process, e.g. a msg3 for contention resolution, which may be transmitted on a physical uplink shared channel based on a resource allocation provided by the radio node.

A delay characteristic (which may correspond to delay spread information) and/or a woo measurement report may represent and/or indicate at least one of mean delay, and/or delay spread, and/or delay distribution, and/or delay spread distribution, and/or delay spread range, and/or relative delay spread, and/or energy (or power) distribution, and/or impulse response to received signaling, and/or the power delay profile of the received signals, and/or power delay profile related parameters of the received signal. A mean delay may represent the mean value and/or an averaged value of the delay spread, which may be weighted or unweighted. A distribution may be distribution over time/delay, e.g. of received power and/or energy of a signal. A range may indicate an interval of the delay spread distribution over time/delay, which may cover a predetermined percentage of the delay spread respective received Imo energy or power, e.g. 50% or more, 75% or more, 90% or more, or 100%. A relative delay spread may indicate a relation to a threshold delay, e.g. of the mean delay, and/or a shift relative to an expected and/or configured timing, e.g. a timing at which the signaling would have been expected based on the scheduling, and/or a relation to a cyclic prefix duration (which may be considered on form of a threshold). Energy distribution or power distribution may pertain to the energy or power received over the time interval of the delay spread. A power delay profile may pertain to representations of the received signals, or the received signals energy/power, across time/delay. Power delay profile related parameters may pertain to metrics computed from the power delay profile. Different values and forms of delay spread information and/or report may be used, allowing a wide range of capabilities. The kind of information represented by a measurement report may be predefined, or be configured or configurable, e.g. with a measurement configuration and/or reference signaling configuration, in particular with higher layer signaling like RRC or MAC signaling and/or physical layer signaling like DCI signaling.

In general, different beam pair may differ in at least one beam; for example, a beam pair using a first received beam and a first transmission beam may be considered to be different from a second beam pair using the first received beam and a second transmission beam. A transmission beam using no precoding and/or beamforming, for example using the natural antenna profile, may be considered as a special form of transmission beam of a transmission beam pair. A beam may be indicated to a radio node by a transmitter with a beam indication and/or a configuration, which for example may indicate beam parameters and/or time/frequency resources associated to the beam and/or a transmission mode and/or antenna profile and/or antenna port and/or precoder associated to the beam. Different beams may be provided with different content, for example different received beams may carry different signaling; however, there may be considered cases in which different beams carry the same signaling, for example the same data signaling and/or reference signaling. The beams may be transmitted by the same node and/or transmission point and/or antenna arrangement, or by different nodes and/or transmission points and/or antenna arrangements.

Communicating utilising a beam pair or a beam may comprise receiving signaling on a received beam (which may be a beam of a beam pair), and/or transmitting signaling on a beam, e.g. a beam of a beam pair. The following terms are to be interpreted from the point of view of the referred radio node: a received beam may be a beam carrying signaling received by the radio node (for reception, the radio node may use a reception beam, e.g. directed to the received beam, or be non-beamformed). A transmission beam may be a beam used by the radio node to transmit signaling. A beam pair may consist of a received beam and a transmission beam. The transmission beam and the received beam of a beam pair may be associated to each and/or correspond to each other, e.g. such that signaling on the received beam and signaling on a transmission beam travel essentially the same path (but in opposite directions), e.g. at least in a stationary or almost stationary condition. It should be noted that the terms "first" and "second" do not necessarily denote an order in time; a second signaling may be received and/or transmitted before, or in some cases simultaneous to, first signaling, or vice versa. The received beam and transmission beam of a beam pair may be on the same carrier or frequency range or bandwidth part, e.g. in a TDD operation; however, variants with FDD may be considered as well. Different beam pairs may operate on the same frequency ranges or carriers or bandwidth parts (e.g., such that transmission beams operate on the same frequency range or carriers or bandwidth part, and received beams on the same frequency range or carriers or bandwidth part (the transmission beam and received beams may be on the same or different ranges or carriers or BWPs). Communicating utilizing a first beam pair and/or first beam may be based on, and/or comprise, switching from the second beam pair or second beam to the first beam pair or first beam for communicating. The switching may be controlled by the network, for example a network node (which may be the source or transmitter of the received beam of the first beam pair and/or second beam pair, or be associated thereto, for example associated transmission points or nodes in dual connectivity). Such controlling may comprise transmitting control signaling, e.g. physical layer signaling and/or higher layer signaling. In some cases, the switching may be performed by the radio node without additional control signaling, for example based on measurements on signal quality and/or signal strength of beam pairs (e.g., of first and second received beams), in particular the first beam pair and/or the second beam pair. For example, it may be switched to the first beam pair (or first beam) if the signal quality or signal strength measured on the second beam pair (or second beam) is considered to be insufficient, and/or worse than corresponding measurements on the first beam pair indicate. Measurements performed on a beam pair (or beam) may in particular comprise measurements performed on a received beam of the beam pair. It may be considered that the timing indication may be determined before switching from the second beam pair to the first beam pair for communicating. Thus, the synchronization may be in place 8 and/or the timing indication may be available for synchronising) when starting communication utilizing the first beam pair or first beam. However, in some cases the timing indication may be determined after switching to the first beam pair or first beam. This may be in particular useful if first signaling is expected to be received after the switching only, for example based on a periodicity or scheduled timing of suitable reference signaling on the first beam pair, e.g. first received beam.

In some variants, reference signaling may be and/or comprise CSI-RS, e.g. transmitted by the network node. In other variants, the reference signaling may be transmitted by a UE, e.g. to a network node or other UE, in which case it may comprise and/or be Sounding Reference Signaling. Other, e.g. new, forms of reference signaling may be considered and/or used. In general, a modulation symbol of reference signaling respectively a resource element carrying it may be associated to a cyclic prefix.

Data signaling may be on a data channel, for example on a PDSCH or PSSCH, or on a dedicated data channel, e.g. for low latency and/or high reliability, e.g. a URLLC channel. Control signaling may be on a control channel, for example on a common control channel or a PDCCH or PSCCH, and/or comprise one or more DCI messages or SCI messages. Reference signaling may be associated to control signaling and/or data signaling, e.g. DM-RS and/or PT-RS.

Reference signaling, for example, may comprise DM-RS and/or pilot signaling and/or discovery signaling and/or synchronisation signaling and/or sounding signaling and/or phase tracking signaling and/or cell-specific reference signaling and/or user-specific signaling, in particular CSI-RS. Reference signaling in general may be signaling with one or more signaling characteristics, in particular transmission power and/or sequence of modulation symbols and/or resource distribution and/or phase distribution known to the receiver. Thus, the receiver can use the reference signaling as a reference and/or for training and/or for compensation. The receiver can be informed about the reference signaling by the transmitter, e.g. being configured and/or signaling with control signaling, in particular physical layer signaling and/or higher layer signaling (e.g., DCI and/or RRC signaling), and/or may determine the corresponding information itself, e.g. a network node configuring a UE to transmit reference signaling. Reference signaling may be signaling comprising one or more reference symbols and/or structures. Reference signaling may be adapted for gauging and/or estimating and/or representing transmission conditions, e.g. channel conditions and/or transmission path conditions and/or channel (or signal or transmission) quality. It may be considered that the transmission characteristics (e.g., signal strength and/or form and/or modulation and/or timing) of reference signaling are available for both transmitter and receiver of the signaling (e.g., due to being predefined and/or configured or configurable and/or being communicated). Different types of reference signaling may be considered, e.g. pertaining to uplink, downlink or sidelink, cell-specific (in particular, cell-wide, e.g., CRS) or device or user specific (addressed to a specific target or user equipment, e.g., CSI-RS), demodulation-related (e.g., DMRS) and/or signal strength related, e.g. power-related or energy-related or amplitude-related (e.g., SRS or pilot signaling) and/or phase-related, etc.

References to specific resource structures like an allocation unit and/or block symbol and/or block symbol group and/or transmission timing structure and/or symbol and/or slot and/or mini-slot and/or subcarrier and/or carrier may pertain to a specific numerology, which may be predefined and/or configured or configurable. A transmission timing structure may represent a time interval, which may cover one or more symbols. Some examples of a transmission timing structure are transmission time interval (TTI), subframe, slot and mini-slot. A slot may comprise a predetermined, e.g. predefined and/or configured or configurable, number of symbols, e.g. 6 or 7, or 12 or 14. A mini-slot may comprise a number of symbols (which may in particular be configurable or configured) smaller than the number of symbols of a slot, in particular 1, 2, 3 or 4, or more symbols, e.g. less symbols than symbols in a slot. A transmission timing structure may cover a time interval of a specific length, which may be dependent on symbol time length and/or cyclic prefix used. A transmission timing structure may pertain to, and/or cover, a specific time interval in a time stream, e.g. synchronized for communication. Timing structures used and/or scheduled for transmission, e.g. slot and/or mini-slots, may be scheduled in relation to, and/or synchronized to, a timing structure provided and/or defined by other transmission timing structures. Such transmission timing structures may define a timing grid, e.g., with symbol time intervals within individual structures representing the smallest timing units. Such a timing grid may for example be defined by slots or subframes (wherein in some cases, subframes may be considered specific variants of slots). A transmission timing structure may have a duration (length in time) determined based on the durations of its symbols, possibly in addition to cyclic prefix/es used. The symbols of a transmission timing structure may have the same duration, or may in some variants have different duration. The number of symbols in a transmission timing structure may be predefined and/or configured or configurable, and/or be dependent on numerology. The timing of a mini-slot may generally be configured or configurable, in particular by the network and/or a network node. The timing may be configurable to start and/or end at any symbol of the transmission timing structure, in particular one or more slots.

A transmission quality parameter may in general correspond to the number R of retransmissions and/or number T of total transmissions, and/or coding (e.g., number of coding bits, e.g. for error detection coding and/or error correction coding like FEC coding) and/or code rate and/or BLER and/or BER requirements and/or transmission power level (e.g., minimum level and/or target level and/or base power level P0 and/or transmission power control command, TPC, step size) and/or signal quality, e.g. SNR and/or SIR and/or SINR and/or power density and/or energy density.

A buffer state report (or buffer status report, BSR) may comprise information representing the presence and/or size of data to be transmitted (e.g., available in one or more buffers, for example provided by higher layers). The size may be indicated explicitly, and/or indexed to range/s of sizes, and/or may pertain to one or more different channel/s and/or acknowledgement processes and/or higher layers and/or channel groups/s, e.g., one or more logical channel/s and/or transport channel/s and/or groups thereof: The structure of a BSR may be predefined and/or configurable of configured, e.g. to override and/or amend a predefined structure, for example with higher layer signaling, e.g. RRC signaling. There may be different forms of BSR with different levels of resolution and/or information, e.g. a more detailed long BSR and a less detailed short BSR. A short BSR may concatenate and/or combine information of a long BSR, e.g. providing sums for data available for one or more channels and/or or channels groups and/or buffers, which might be represented individually in a long BSR; and/or may index a less-detailed range scheme for data available or buffered. A BSR may be used in lieu of a scheduling request, e.g. by a network node scheduling or allocating (uplink) resources for the transmitting radio node like a wireless device or UE or IAB node.

There is generally considered a program product comprising instructions adapted for causing processing and/or control circuitry to carry out and/or control any method described herein, in particular when executed on the processing and/or control circuitry. Also, there is considered a carrier medium arrangement carrying and/or storing a program product as described herein.

A carrier medium arrangement may comprise one or more carrier media. Generally, a carrier medium may be accessible and/or readable and/or receivable by processing or control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

A system comprising one or more radio nodes as described herein, in particular a network node and a user equipment, is described. The system may be a wireless communication system, and/or provide and/or represent a radio access network.

Moreover, there may be generally considered a method of operating an information system, the method comprising providing information. Alternatively, or additionally, an information system adapted for providing information may be considered.

Providing information may comprise providing information for, and/or to, a target system, which may comprise and/or be implemented as radio access network and/or a radio node, in particular a network node or user equipment or terminal. Providing information may comprise transferring and/or streaming and/or sending and/or passing on the information, and/or offering the information for such and/or for download, and/or triggering such providing, e.g. by triggering a different system or node to stream and/or transfer and/or send and/or pass on the information. The information system may comprise, and/or be connected or connectable to, a target, for example via one or more intermediate systems, e.g. a core network and/or internet and/or private or local network. Information may be provided utilising and/or via such intermediate system/s. Providing information may be for radio transmission and/or for transmission via an air interface and/or utilising a RAN or radio node as described herein. Connecting the information system to a target, and/or providing information, may be based on a target indication, and/or adaptive to a target indication. A target indication may indicate the target, and/or one or more parameters of transmission pertaining to the target and/or the paths or connections over which the information is provided to the target. Such parameter/s may in particular pertain to the air interface and/or radio access network and/or radio node and/or network node. Example parameters may indicate for example type and/or nature of the target, and/or transmission capacity (e.g., data rate) and/or latency and/or reliability and/or cost, respectively one or more estimates thereof. The target indication may be provided by the target, or determined by the information system, e.g. based on information received from the target and/or historical information, and/or be provided by a user, for example a user operating the target or a device in communication with the target, e.g. via the RAN and/or air interface. For example, a user may indicate on a user equipment communicating with the information system that information is to be provided via a RAN, e.g. by selecting from a selection provided by the information system, for example on a user application or user interface, which may be a web interface. An information system may comprise one or more information nodes. An information node may generally comprise processing circuitry and/or communication circuitry. In particular, an information system and/or an information node may be implemented as a computer and/or a computer arrangement, e.g. a host computer or host computer arrangement and/or server or server arrangement. In some variants, an interaction server (e.g., web server) of the information system may provide a user interface, and based on user input may trigger transmitting and/or streaming information provision to the user (and/or the target) from another server, which may be connected or connectable to the interaction server and/or be part of the information system or be connected or connectable thereto. The information may be any kind of data, in particular data intended for a user of for use at a terminal, e.g. video data and/or audio data and/or location data and/or interactive data and/or game-related data and/or environmental data and/or technical data and/or traffic data and/or vehicular data and/or circumstantial data and/or operational data. The information provided by the information system may be mapped to, and/or mappable to, and/or be intended for mapping to, communication or data signaling and/or one or more data channels as described herein (which may be signaling or channel/s of an air interface and/or used within a RAN and/or for radio transmission). It may be considered that the information is formatted based on the target indication and/or target, e.g. regarding data amount and/or data rate and/or data structure and/or timing, which in particular may be pertaining to a mapping to communication or data signaling and/or a data channel. Mapping information to data signaling and/or data channel/s may be considered to refer to using the signaling/channel/s to carry the data, e.g. on higher layers of communication, with the signaling/channel/s underlying the transmission. A target indication generally may comprise different components, which may have different sources, and/or which may indicate different characteristics of the target and/or communication path/s thereto. A format of information may be specifically selected, e.g. from a set of different formats, for information to be transmitted on an air interface and/or by a RAN as described herein. This may be particularly pertinent since an air interface may be limited in terms of capacity and/or of predictability, and/or potentially be cost sensitive. The format may be selected to be adapted to the transmission indication, which may in particular indicate that a RAN or radio node as described herein is in the path (which may be the indicated and/or planned and/or expected path) of information between the target and the information system. A (communication) path of information may represent the interface/s (e.g., air and/or cable interfaces) and/or the intermediate system/s (if any), between the information system and/or the node providing or transferring the information, and the target, over which the information is, or is to be, passed on. A path may be (at least partly) undetermined when a target indication is provided, and/or the information is provided/transferred by the information system, e.g. if an internet is involved, which may comprise multiple, dynamically chosen paths. Information and/or a format used for information may be packet-based, and/or be mapped, and/or be mappable and/or be intended for mapping, to packets. Alternatively, or additionally, there may be considered a method for operating a target device comprising providing a target indicating to an information system. More alternatively, or additionally, a target device may be considered, the target device being adapted for providing a target indication to an information system. In another approach, there may be considered a target indication tool adapted for, and/or comprising an indication module for, providing a target indication to an information system. The target device may generally be a target as described above. A target indication tool may comprise, and/or be implemented as, software and/or application or app, and/or web interface or user interface, and/or may comprise one or more modules for implementing actions performed and/or controlled by the tool. The tool and/or target device may be adapted for, and/or the method may comprise, receiving a user input, based on which a target indicating may be determined and/or provided. Alternatively, or additionally, the tool and/or target device may be adapted for, and/or the method may comprise, receiving information and/or communication signaling carrying information, and/or operating on, and/or presenting (e.g., on a screen and/or as audio or as other form of indication), information. The information may be based on received information and/or communication signaling carrying information. Presenting information may comprise processing received information, e.g. decoding and/or transforming, in particular between different formats, and/or for hardware used for presenting. Operating on information may be independent of or without presenting, and/or proceed or succeed presenting, and/or may be without user interaction or even user reception, for example for automatic processes, or target devices without (e.g., regular) user interaction like MTC devices, of for automotive or transport or industrial use. The information or communication signaling may be expected and/or received based on the target indication. Presenting and/or operating on information may generally comprise one or more processing steps, in particular decoding and/or executing and/or interpreting and/or transforming information. Operating on information may generally comprise relaying and/or transmitting the information, e.g. on an air interface, which may include mapping the information onto signaling (such mapping may generally pertain to one or more layers, e.g. one or more layers of an air interface, e.g. RLC (Radio Link Control) layer and/or MAC layer and/or physical layer/s). The information may be imprinted (or mapped) on communication signaling based on the target indication, which may make it particularly suitable for use in a RAN (e.g., for a target device like a network node or in particular a UE or terminal). The tool may generally be adapted for use on a target device, like a UE or terminal. Generally, the tool may provide multiple functionalities, e.g. for providing and/or selecting the target indication, and/or presenting, e.g. video and/or audio, and/or operating on and/or storing received information. Providing a target indication may comprise transmitting or transferring the indication as signaling, and/or carried on signaling, in a RAN, for example if the target device is a UE, or the tool for a UE. It should be noted that such provided information may be transferred to the information system via one or more additionally communication interfaces and/or paths and/or connections. The target indication may be a higher-layer indication and/or the information provided by the information system may be higher-layer information, e.g. application layer or user-layer, in particular above radio layers like transport layer and physical layer. The target indication may be mapped on physical layer radio signaling, e.g. related to or on the user-plane, and/or the information may be mapped on physical layer radio communication signaling, e.g. related to or on the user-plane (in particular, in reverse communication directions). The described approaches allow a target indication to be provided, facilitating information to be provided in a specific format particularly suitable and/or adapted to efficiently use an air interface. A user input may for example represent a selection from a plurality of possible transmission modes or formats, and/or paths, e.g. in terms of data rate and/or packaging and/or size of information to be provided by the information system.

In general, a numerology and/or subcarrier spacing may indicate the bandwidth (in frequency domain) of a subcarrier of a carrier, and/or the number of subcarriers in a carrier and/or the numbering of the subcarriers in a carrier, and/or the symbol time length. Different numerologies may in particular be different in the bandwidth of a subcarrier. In some variants, all the subcarriers in a carrier have the same bandwidth associated to them. The numerology and/or subcarrier spacing may be different between carriers in particular regarding the subcarrier bandwidth. A symbol time length, and/or a time length of a timing structure pertaining to a carrier may be dependent on the carrier frequency, and/or the subcarrier spacing and/or the numerology. In particular, different numerologies may have different symbol time lengths, even on the same carrier.

Signaling may generally comprise one or more (e.g., modulation) symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g. representing and/or pertaining to one or more such processes. Signaling associated to a channel may be transmitted such that represents signaling and/or information for that channel, and/or that the signaling is interpreted by the transmitter and/or receiver to belong to that channel. Such signaling may generally comply with transmission parameters and/or format/s for the channel.

An antenna arrangement may comprise one or more antenna elements (radiating elements), which may be combined in antenna arrays. An antenna array or subarray may comprise one antenna element, or a plurality of antenna elements, which may be arranged e.g. two dimensionally (for example, a panel) or three dimensionally. It may be considered that each antenna array or subarray or element is separately controllable, respectively that different antenna arrays are controllable separately from each other. A single antenna element/radiator may be considered the smallest example of a subarray. Examples of antenna arrays comprise one or more multi-antenna panels or one or more individually controllable antenna elements. An antenna arrangement may comprise a plurality of antenna arrays. It may be considered that an antenna arrangement is associated to a (specific and/or single) radio node, e.g. a configuring or informing or scheduling radio node, e.g. to be controlled or controllable by the radio node. An antenna arrangement associated to a UE or terminal may be smaller (e.g., in size and/or number of antenna elements or arrays) than the antenna arrangement associated to a network node. Antenna elements of an antenna arrangement may be configurable for different arrays, e.g. to change the beamforming characteristics. In particular, antenna arrays may be formed by combining one or more independently or separately controllable antenna elements or subarrays. The beams may be provided by analog beamforming, or in some variants by digital beamforming, or by hybrid beamforming combing analog and digital beamforming. The informing radio nodes may be configured with the manner of beam transmission, e.g. by transmitting a corresponding indicator or indication, for example as beam identify indication. However, there may be considered cases in which the informing radio node/s are not configured with such information, and/or operate transparently, not knowing the way of beamforming used. An antenna arrangement may be considered separately controllable in regard to the phase and/or amplitude/power and/or gain of a signal feed to it for transmission, and/or separately controllable antenna arrangements may comprise an independent or separate transmit and/or receive unit and/or ADC (Analog-Digital-Converter, alternatively an ADC chain) or DCA (Digital-to-Analog Converter, alternatively a DCA chain) to convert digital control information into an analog antenna feed for the whole antenna arrangement (the ADC/DCA may be considered part of, and/or connected or connectable to, antenna circuitry) or vice versa. A scenario in which an ADC or DCA is controlled directly for beamforming may be considered an analog beamforming scenario; such controlling may be performed after encoding/decoding and/or after modulation symbols have been mapped to resource elements. This may be on the level of antenna arrangements using the same ADC/DCA, e.g. one antenna element or a group of antenna elements associated to the same ADC/DCA. Digital beamforming may correspond to a scenario in which processing for beamforming is provided before feeding signaling to the ADC/DCA, e.g. by using one or more precoder/s and/or by precoding information, for example before and/or when mapping modulation symbols to resource elements. Such a precoder for beamforming may provide weights, e.g. for amplitude and/or phase, and/or may be based on a (precoder) codebook, e.g. selected from a codebook. A precoder may pertain to one beam or more beams, e.g. defining the beam or beams. The codebook may be configured or configurable, and/or be predefined. DFT beamforming may be considered a form of digital beamforming, wherein a DFT procedure is used to form one or more beams. Hybrid forms of beamforming may be considered.

A beam may be defined by a spatial and/or angular and/or spatial angular distribution of radiation and/or a spatial angle (also referred to as solid angle) or spatial (solid) angle distribution into which radiation is transmitted (for transmission beamforming) or from which it is received (for reception beamforming). Reception beamforming may comprise only accepting signals coming in from a reception beam (e.g., using analog beamforming to not receive outside reception beam/s), and/or sorting out signals that do not come in in a reception beam, e.g. in digital postprocessing, e.g. digital beamforming. A beam may have a solid angle equal to or smaller than $4*pi$ sr ($4*pi$ correspond to a beam covering all directions), in particular smaller than $2*pi$, or pi, or pi/2, or pi/4 or pi/8 or pi/16. In particular for high frequencies, smaller beams may be used. Different beams may have different directions and/or sizes (e.g., solid angle and/or reach). A beam may have a main direction, which may be defined by a main lobe (e.g., center of the main lobe, e.g. pertaining to signal strength and/or solid angle, which may be averaged and/or weighted to determine the direction), and may have one or more sidelobes. A lobe may generally be defined to have a continuous or contiguous distribution of energy and/or power transmitted and/or received, e.g. bounded by one or more contiguous or contiguous regions of zero energy (or practically zero energy). A main lobe may comprise the lobe with the largest signal strength and/or energy and/or power content. However, sidelobes usually appear due to limitations of beamforming, some of which may carry signals with significant strength, and may cause multi-path effects. A sidelobe may generally have a different direction than a main lobe and/or other side lobes, however, due to reflections a sidelobe still may contribute to transmitted and/or received energy or power. A beam may be swept and/or switched over time, e.g., such that its (main) direction is changed, but its shape (angular/solid angle distribution) around the main direction is not changed, e.g. from the transmitter's views for a transmission beam, or the receiver's view for a reception beam, respectively. Sweeping may correspond to continuous or near continuous change of main direction (e.g., such that after each change, the main lobe from before the change covers at least partly the main lobe after the change, e.g. at least to 50 or 75 or 90 percent). Switching may correspond to switching direction non-continuously, e.g. such that after each change, the main lobe from before the change does not cover the main lobe after the change, e.g. at most to 50 or 25 or 10 percent.

Signal strength may be a representation of signal power and/or signal energy, e.g. as seen from a transmitting node or a receiving node. A beam with larger strength at transmission (e.g., according to the beamforming used) than another beam does may not necessarily have larger strength at the receiver, and vice versa, for example due to interference and/or obstruction and/or dispersion and/or absorption and/or reflection and/or attrition or other effects influencing a beam or the signaling it carries. Signal quality may in general be a representation of how well a signal may be received over noise and/or interference. A beam with better signal quality than another beam does not necessarily have a larger beam strength than the other beam. Signal quality may be represented for example by SIR, SNR, SINR, BER, BLER, Energy per resource element over noise/interference or another corresponding quality measure. Signal quality and/or signal strength may pertain to, and/or may be measured with respect to, a beam, and/or specific signaling carried by the beam, e.g. reference signaling and/or a specific channel, e.g. a data channel or control channel. Signal strength may be represented by received signal strength, and/or relative signal strength, e.g. in comparison to a reference signal (strength).

Uplink or sidelink signaling may be OFDMA (Orthogonal Frequency Division Multiple Access) or SC-FDMA (Single Carrier Frequency Division Multiple Access) signaling. Downlink signaling may in particular be OFDMA signaling. However, signaling is not limited thereto (Filter-Bank based signaling and/or Single-Carrier based signaling, e.g. SC-FDE signaling, may be considered alternatives).

A radio node may generally be considered a device or node adapted for wireless and/or radio (and/or millimeter wave) frequency communication, and/or for communication utilising an air interface, e.g. according to a communication standard.

A radio node may be a network node, or a user equipment or terminal. A network node may be any radio node of a wireless communication network, e.g. a base station and/or gNodeB (gNB) and/or eNodeB (eNB) and/or relay node and/or micro/nano/pico/femto node and/or transmission point (TP) and/or access point (AP) and/or other node, in particular for a RAN or other wireless communication network as described herein.

The terms user equipment (UE) and terminal may be considered to be interchangeable in the context of this disclosure. A wireless device, user equipment or terminal may represent an end device for communication utilising the wireless communication network, and/or be implemented as a user equipment according to a standard. Examples of user equipments may comprise a phone like a smartphone, a personal communication device, a mobile phone or terminal, a computer, in particular laptop, a sensor or machine with radio capability (and/or adapted for the air interface), in particular for MTC (Machine-Type-Communication, sometimes also referred to M2M, Machine-To-Machine), or a vehicle adapted for wireless communication. A user equipment or terminal may be mobile or stationary. A wireless device generally may comprise, and/or be implemented as, processing circuitry and/or radio circuitry, which may comprise one or more chips or sets of chips. The circuitry and/or circuitries may be packaged, e.g. in a chip housing, and/or may have one or more physical interfaces to interact with other circuitry and/or for power supply. Such a wireless device may be intended for use in a user equipment or terminal.

A radio node may generally comprise processing circuitry and/or radio circuitry. A radio node, in particular a network node, may in some cases comprise cable circuitry and/or communication circuitry, with which it may be connected or connectable to another radio node and/or a core network.

Circuitry may comprise integrated circuitry. Processing circuitry may comprise one or more processors and/or controllers (e.g., microcontrollers), and/or ASICs (Application Specific Integrated Circuitry) and/or FPGAs (Field Programmable Gate Array), or similar. It may be considered that processing circuitry comprises, and/or is (operatively) connected or connectable to one or more memories or memory arrangements. A memory arrangement may comprise one or more memories. A memory may be adapted to store digital information. Examples for memories comprise volatile and non-volatile memory, and/or Random Access Memory (RAM), and/or Read-Only-Memory (ROM), and/or magnetic and/or optical memory, and/or flash memory, and/or hard disk memory, and/or EPROM or EEPROM (Erasable Programmable ROM or Electrically Erasable Programmable ROM).

Radio circuitry may comprise one or more transmitters and/or receivers and/or transceivers (a transceiver may operate or be operable as transmitter and receiver, and/or may comprise joint or separated circuitry for receiving and transmitting, e.g. in one package or housing), and/or may comprise one or more amplifiers and/or oscillators and/or filters, and/or may comprise, and/or be connected or connectable to antenna circuitry and/or one or more antennas and/or antenna arrays. An antenna array may comprise one or more antennas, which may be arranged in a dimensional array, e.g. 2D or 3D array, and/or antenna panels. A remote radio head (RRH) may be considered as an example of an antenna array. However, in some variants, an RRH may be also be implemented as a network node, depending on the kind of circuitry and/or functionality implemented therein.

Communication circuitry may comprise radio circuitry and/or cable circuitry. Communication circuitry generally may comprise one or more interfaces, which may be air interface/s and/or cable interface/s and/or optical interface/s, e.g. laser-based. Interface/s may be in particular packet-based. Cable circuitry and/or a cable interfaces may comprise, and/or be connected or connectable to, one or more cables (e.g., optical fiber-based and/or wire-based), which may be directly or indirectly (e.g., via one or more intermediate systems and/or interfaces) be connected or connectable to a target, e.g. controlled by communication circuitry and/or processing circuitry.

Any one or all of the modules disclosed herein may be implemented in software and/or firmware and/or hardware. Different modules may be associated to different components of a radio node, e.g. different circuitries or different parts of a circuitry. It may be considered that a module is distributed over different components and/or circuitries. A program product as described herein may comprise the modules related to a device on which the program product is intended (e.g., a user equipment or network node) to be executed (the execution may be performed on, and/or controlled by the associated circuitry).

A wireless communication network may be or comprise a radio access network and/or a backhaul network (e.g. a relay or backhaul network or an IAB network), and/or a Radio Access Network (RAN) in particular according to a communication standard. A communication standard may in particular a standard according to 3GPP and/or 5G, e.g. according to NR or LTE, in particular LTE Evolution.

A wireless communication network may be and/or comprise a Radio Access Network (RAN), which may be and/or comprise any kind of cellular and/or wireless radio network, which may be connected or connectable to a core network. The approaches described herein are particularly suitable for a 5G network, e.g. LTE Evolution and/or NR (New Radio), respectively successors thereof. A RAN may comprise one or more network nodes, and/or one or more terminals, and/or one or more radio nodes. A network node may in particular be a radio node adapted for radio and/or wireless and/or cellular communication with one or more terminals. A terminal may be any device adapted for radio and/or wireless and/or cellular communication with or within a RAN, e.g. a user equipment (UE) or mobile phone or smartphone or computing device or vehicular communication device or device for machine-type-communication (MTC), etc. A terminal may be mobile, or in some cases stationary. A RAN or a wireless communication network may comprise at least one network node and a UE, or at least two radio nodes. There may be generally considered a wireless communication network or system, e.g. a RAN or RAN system, comprising at least one radio node, and/or at least one network node and at least one terminal.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Control information or a control information message or corresponding signaling (control signaling) may be transmitted on a control channel, e.g. a physical control channel, which may be a downlink channel or (or a sidelink channel in some cases, e.g. one UE scheduling another UE). For example, control information/allocation information may be signaled by a network node on PDCCH (Physical Downlink Control Channel) and/or a PDSCH (Physical Downlink Shared Channel) and/or a HARQ-specific channel. Acknowledgement signaling, e.g. as a form of control information or signaling like uplink control information/signaling, may be transmitted by a terminal on a PUCCH (Physical Uplink Control Channel) and/or PUSCH (Physical Uplink Shared Channel) and/or a HARQ-specific channel. Multiple channels may apply for multi-component/multi-carrier indication or signaling.

Transmitting acknowledgement signaling may in general be based on and/or in response to subject transmission, and/or to control signaling scheduling subject transmission. Such control signaling and/or subject signaling may be transmitted by a signaling radio node (which may be a network node, and/or a node associated to it, e.g. in a dual connectivity scenario. Subject transmission and/or subject signaling may be transmission or signaling to which ACK/NACK or acknowledgement information pertains, e.g. indicating correct or incorrect reception and/or decoding of the subject transmission or signaling. Subject signaling or transmission may in particular comprise and/or be represented by data signaling, e.g. on a PDSCH or PSSCH, or some forms of control signaling, e.g. on a PDCCH or PSSCH, for example for specific formats.

A signaling characteristic may be based on a type or format of a scheduling grant and/or scheduling assignment, and/or type of allocation, and/or timing of acknowledgement signaling and/or the scheduling grant and/or scheduling assignment, and/or resources associated to acknowledgement signaling and/or the scheduling grant and/or scheduling assignment. For example, if a specific format for a scheduling grant (scheduling or allocating the allocated resources) or scheduling assignment (scheduling the subject transmission for acknowledgement signaling) is used or detected, the first or second communication resource may be used. Type of allocation may pertain to dynamic allocation (e.g., using DCI/PDCCH) or semi-static allocation (e.g., for a configured grant). Timing of acknowledgement signaling may pertain to a slot and/or symbol/s the signaling is to be transmitted. Resources used for acknowledgement signaling may pertain to the allocated resources. Timing and/or resources associated to a scheduling grant or assignment may represent a search space or CORESET (a set of resources configured for reception of PDCCH transmissions) in which the grant or assignment is received. Thus, which transmission resource to be used may be based on implicit conditions, requiring low signaling overhead.

Scheduling may comprise indicating, e.g. with control signaling like DCI or SCI signaling and/or signaling on a control channel like PDCCH or PSCCH, one or more scheduling opportunities of a configuration intended to carry data signaling or subject signaling. The configuration may be represented or representable by, and/or correspond to, a table. A scheduling assignment may for example point to an opportunity of the reception allocation configuration, e.g. indexing a table of scheduling opportunities. In some cases, a reception allocation configuration may comprise 15 or 16 scheduling opportunities. The configuration may in particular represent allocation in time. It may be considered that the reception allocation configuration pertains to data signaling, in particular on a physical data channel like PDSCH or PSSCH. In general, the reception allocation configuration may pertain to downlink signaling, or in some scenarios to sidelink signaling. Control signaling scheduling subject transmission like data signaling may point and/or index and/or refer to and/or indicate a scheduling opportunity of the reception allocation configuration. It may be considered that the reception allocation configuration is configured or configurable with higher-layer signaling, e.g. RRC or MAC layer signaling. The reception allocation configuration may be applied and/or applicable and/or valid for a plurality of transmission timing intervals, e.g. such that for each interval, one or more opportunities may be indicated or allocated for data signaling. These approaches allow efficient and flexible scheduling, which may be semi-static, but may updated or reconfigured on useful timescales in response to changes of operation conditions.

Control information, e.g., in a control information message, in this context may in particular be implemented as and/or represented by a scheduling assignment, which may indicate subject transmission for feedback (transmission of acknowledgement signaling), and/or reporting timing and/or frequency resources and/or code resources. Reporting timing may indicate a timing for scheduled acknowledgement signaling, e.g. slot and/or symbol and/or resource set. Control information may be carried by control signaling.

Subject transmissions may comprise one or more individual transmissions. Scheduling assignments may comprise one or more scheduling assignments. It should generally be noted that in a distributed system, subject transmissions, configuration and/or scheduling may be provided by different nodes or devices or transmission points. Different subject transmissions may be on the same carrier or different carriers (e.g., in a carrier aggregation), and/or same or different bandwidth parts, and/or on the same or different layers or beams, e.g. in a MIMO scenario, and/or to same or different ports. Generally, subject transmissions may pertain to different HARQ or ARQ processes (or different sub-processes, e.g. in MIMO with different beams/layers associated to the same process identifier, but different sub-process-identifiers like swap bits). A scheduling assignment and/or a HARQ codebook may indicate a target HARQ structure. A target HARQ structure may for example indicate an intended HARQ response to a subject transmission, e.g. the number of bits and/or whether to provide code block group level response or not. However, it should be noted that the actual structure used may differ from the target structure, e.g. due to the total size of target structures for a subpattern being larger than the predetermined size.

Transmitting acknowledgement signaling, also referred to as transmitting acknowledgement information or feedback information or simply as ARQ or HARQ feedback or feedback or reporting feedback, may comprise, and/or be based on determining correct or incorrect reception of subject transmission/s, e.g. based on error coding and/or based on scheduling assignment/s scheduling the subject transmissions. Transmitting acknowledgement information may be based on, and/or comprise, a structure for acknowledgement information to transmit, e.g. the structure of one or more subpatterns, e.g. based on which subject transmission is scheduled for an associated subdivision. Transmitting acknowledgement information may comprise transmitting corresponding signaling, e.g. at one instance and/or in one message and/or one channel, in particular a physical channel, which may be a control channel. In some cases, the channel may be a shared channel or data channel, e.g. utilising rate-matching of the acknowledgment information. The acknowledgement information may generally pertain to a plurality of subject transmissions, which may be on different channels and/or carriers, and/or may comprise data signaling and/or control signaling. The acknowledgment information may be based on a codebook, which may be based on one or more size indications and/or assignment indications (representing HARQ structures), which may be received with a plurality of control signalings and/or control messages, e.g. in the same or different transmission timing structures, and/or in the same or different (target) sets of resources. Transmitting acknowledgement information may comprise determining the codebook, e.g. based on control information in one or more control information messages and/or a configuration. A codebook may pertain to transmitting acknowledgement information at a single and/or specific instant, e.g. a single PUCCH or PUSCH transmission, and/or in one message or with jointly encoded and/or modulated acknowledgement information. Generally, acknowledgment information may be transmitted together with other control information, e.g. a scheduling request and/or measurement information.

Acknowledgement signaling may in some cases comprise, next to acknowledgement information, other information, e.g. control information, in particular, uplink or sidelink control information, like a scheduling request and/or measurement information, or similar, and/or error detection and/or correction information, respectively associated bits. The payload size of acknowledgement signaling may represent the number of bits of acknowledgement information, and/or in some cases the total number of bits carried by the acknowledgement signaling, and/or the number of resource elements needed. Acknowledgement signaling and/or information may pertain to ARQ and/or HARQ processes; an ARQ process may provide ACK/NACK (and perhaps additional feedback) feedback, and decoding may be performed on each (re-)transmission separately, without soft-buffering/soft-combining intermediate data, whereas HARQ may comprise soft-buffering/soft-combining of intermediate data of decoding for one or more (re-)transmissions.

Subject transmission may be data signaling or control signaling. The transmission may be on a shared or dedicated channel. Data signaling may be on a data channel, for example on a PDSCH or PSSCH, or on a dedicated data channel, e.g. for low latency and/or high reliability, e.g. a URLLC channel. Control signaling may be on a control channel, for example on a common control channel or a PDCCH or PSCCH, and/or comprise one or more DCI messages or SCI messages. In some cases, the subject transmission may comprise, or represent, reference signaling. For example, it may comprise DM-RS and/or pilot signaling and/or discovery signaling and/or sounding signaling and/or phase tracking signaling and/or cell-specific reference signaling and/or user-specific signaling, in particular CSI-RS. A subject transmission may pertain to one scheduling assignment and/or one acknowledgement signaling process (e.g., according to identifier or subidentifier), and/or one subdivision. In some cases, a subject transmission may cross the borders of subdivisions in time, e.g. due to being scheduled to start in one subdivision and extending into another, or even crossing over more than one subdivision. In this case, it may be considered that the subject transmission is associated to the subdivision it ends in.

It may be considered that transmitting acknowledgement information, in particular of acknowledgement information, is based on determining whether the subject transmission/s has or have been received correctly, e.g. based on error coding and/or reception quality. Reception quality may for example be based on a determined signal quality. Acknowledgement information may generally be transmitted to a signaling radio node and/or node arrangement and/or to a network and/or network node.

Acknowledgement information, or bit/s of a subpattern structure of such information (e.g., an acknowledgement information structure, may represent and/or comprise one or more bits, in particular a pattern of bits. Multiple bits pertaining to a data structure or substructure or message like a control message may be considered a subpattern. The structure or arrangement of acknowledgement information may indicate the order, and/or meaning, and/or mapping, and/or pattern of bits (or subpatterns of bits) of the information. The structure or mapping may in particular indicate one or more data block structures, e.g. code blocks and/or code block groups and/or transport blocks and/or messages, e.g. command messages, the acknowledgement information pertains to, and/or which bits or subpattern of bits are associated to which data block structure. In some cases, the mapping may pertain to one or more acknowledgement signaling processes, e.g. processes with different identifiers, and/or one or more different data streams. The configuration or structure or codebook may indicate to which process/es and/or data stream/s the information pertains. Generally, the acknowledgement information may comprise one or more subpatterns, each of which may pertain to a data block structure, e.g. a code block or code block group or transport block. A subpattern may be arranged to indicate acknowledgement or non-acknowledgement, or another retransmission state like non-scheduling or non-reception, of the associated data block structure. It may be considered that a subpattern comprises one bit, or in some cases more than one bit. It should be noted that acknowledgement information may be subjected to significant processing before being transmitted with acknowledgement signaling. Different configurations may indicate different sizes and/or mapping and/or structures and/or pattern.

An acknowledgment signaling process (providing acknowledgment information) may be a HARQ process, and/or be identified by a process identifier, e.g. a HARQ process identifier or subidentifier. Acknowledgement signaling and/or associated acknowledgement information may be referred to as feedback or acknowledgement feedback. It should be noted that data blocks or structures to which subpatterns may pertain may be intended to carry data (e.g., information and/or systemic and/or coding bits). However, depending on transmission conditions, such data may be received or not received (or not received correctly), which may be indicated correspondingly in the feedback. In some cases, a subpattern of acknowledgement signaling may comprise padding bits, e.g. if the acknowledgement information for a data block requires fewer bits than indicated as size of the subpattern. Such may for example happen if the size is indicated by a unit size larger than required for the feedback.

Acknowledgment information may generally indicate at least ACK or NACK, e.g. pertaining to an acknowledgment signaling process, or an element of a data block structure like a data block, subblock group or subblock, or a message, in particular a control message. Generally, to an acknowledgment signaling process there may be associated one specific subpattern and/or a data block structure, for which acknowledgment information may be provided. Acknowledgement information may comprise a plurality of pieces of information, represented in a plurality of ARQ and/or HARQ structures.

An acknowledgment signaling process may determine correct or incorrect reception, and/or corresponding acknowledgement information, of a data block like a transport block, and/or substructures thereof, based on coding bits associated to the data block, and/or based on coding bits associated to one or more data block and/or subblocks and/or subblock group/s. Acknowledgement information (determined by an acknowledgement signaling process) may pertain to the data block as a whole, and/or to one or more subblocks or subblock groups. A code block may be considered an example of a subblock, whereas a code block group may be considered an example of a subblock group. Accordingly, the associated subpattern may comprise one or more bits indicating reception status or feedback of the data block, and/or one or more bits indicating reception status or feedback of one or more subblocks or subblock groups. Each subpattern or bit of the subpattern may be associated and/or mapped to a specific data block or subblock or subblock group. In some variants, correct reception for a data block may be indicated if all subblocks or subblock groups are correctly identified. In such a case, the subpattern may represent acknowledgement information for the data block as a whole, reducing overhead in comparison to provide acknowledgement information for the subblocks or subblock groups. The smallest structure (e.g. subblock/subblock group/data block) the subpattern provides acknowledgement information for and/or is associated to may be considered its (highest) resolution. In some variants, a subpattern may provide acknowledgment information regarding several elements of a data block structure and/or at different resolution, e.g. to allow more specific error detection. For example, even if a subpattern indicates acknowledgment signaling pertaining to a data block as a whole, in some variants higher resolution (e.g., subblock or subblock group resolution) may be provided by the subpattern. A subpattern may generally comprise one or more bits indicating ACK/NACK for a data block, and/or one or more bits for indicating ACK/NACK for a subblock or subblock group, or for more than one subblock or subblock group.

A subblock and/or subblock group may comprise information bits (representing the data to be transmitted, e.g. user data and/or downlink/sidelink data or uplink data). It may be considered that a data block and/or subblock and/or subblock group also comprises error one or more error detection bits, which may pertain to, and/or be determined based on, the information bits (for a subblock group, the error detection bit/s may be determined based on the information bits and/or error detection bits and/or error correction bits of the subblock/s of the subblock group). A data block or substructure like subblock or subblock group may comprise error correction bits, which may in particular be determined based on the information bits and error detection bits of the block or substructure, e.g. utilising an error correction coding scheme, in particular for forward error correction (FEC), e.g. LDPC or polar coding and/or turbo coding. Generally, the error correction coding of a data block structure (and/or associated bits) may cover and/or pertain to information bits and error detection bits of the structure. A subblock group may represent a combination of one or more code blocks, respectively the corresponding bits. A data block may represent a code block or code block group, or a combination of more than one code block groups. A transport block may be split up in code blocks and/or code block groups, for example based on the bit size of the information bits of a higher layer data structure provided for error coding and/or size requirements or preferences for error coding, in particular error correction coding. Such a higher layer data structure is sometimes also referred to as transport block, which in this context represents information bits without the error coding bits described herein, although higher layer error handling information may be included, e.g. for an internet protocol like TCP. However, such error handling information represents information bits in the context of this disclosure, as the acknowledgement signaling procedures described treat it accordingly.

In some variants, a subblock like a code block may comprise error correction bits, which may be determined based on the information bit/s and/or error detection bit/s of the subblock. An error correction coding scheme may be used for determining the error correction bits, e.g. based on LDPC or polar coding or Reed-Mueller coding. In some cases, a subblock or code block may be considered to be defined as a block or pattern of bits comprising information bits, error detection bit/s determined based on the information bits, and error correction bit/s determined based on the information bits and/or error detection bit/s. It may be considered that in a subblock, e.g. code block, the information bits (and possibly the error correction bit/s) are protected and/or covered by the error correction scheme or corresponding error correction bit/s. A code block group may comprise one or more code blocks. In some variants, no additional error detection bits and/or error correction bits are applied, however, it may be considered to apply either or both. A transport block may comprise one or more code block groups. It may be considered that no additional error detection bits and/or error correction bits are applied to a transport block, however, it may be considered to apply either or both. In some specific variants, the code block group/s comprise no additional layers of error detection or correction coding, and the transport block may comprise only additional error detection coding bits, but no additional error correction coding. This may particularly be true if the transport block size is larger than the code block size and/or the maximum size for error correction coding. A subpattern of acknowledgement signaling (in particular indicating ACK or NACK) may pertain to a code block, e.g. indicating whether the code block has been correctly received. It may be considered that a subpattern pertains to a subgroup like a code block group or a data block like a transport block. In such cases, it may indicate ACK, if all subblocks or code blocks of the group or data/transport block are received correctly (e.g. based on a logical AND operation), and NACK or another state of non-correct reception if at least one subblock or code block has not been correctly received. It should be noted that a code block may be considered to be correctly received not only if it actually has been correctly received, but also if it can be correctly reconstructed based on soft-combining and/or the error correction coding.

A subpattern/HARQ structure may pertain to one acknowledgement signaling process and/or one carrier like a component carrier and/or data block structure or data block. It may in particular be considered that one (e.g. specific and/or single) subpattern pertains, e.g. is mapped by the codebook, to one (e.g., specific and/or single) acknowledgement signaling process, e.g. a specific and/or single HARQ process. It may be considered that in the bit pattern, subpatterns are mapped to acknowledgement signaling processes and/or data blocks or data block structures on a one-to-one basis. In some variants, there may be multiple subpatterns (and/or associated acknowledgment signaling processes) associated to the same component carrier, e.g. if multiple data streams transmitted on the carrier are subject to acknowledgement signaling processes. A subpattern may comprise one or more bits, the number of which may be considered to represent its size or bit size. Different bit n-tupels (n being 1 or larger) of a subpattern may be associated to different elements of a data block structure (e.g., data block or subblock or subblock group), and/or represent different resolutions. There may be considered variants in which only one resolution is represented by a bit pattern, e.g. a data block. A bit n-tupel may represent acknowledgement information (also referred to a feedback), in particular ACK or NACK, and optionally, (if n>1), may represent DTX/DRX or other reception states. ACK/NACK may be represented by one bit, or by more than one bit, e.g. to improve disambiguity of bit sequences representing ACK or NACK, and/or to improve transmission reliability.

The acknowledgement information or feedback information may pertain to a plurality of different transmissions, which may be associated to and/or represented by data block structures, respectively the associated data blocks or data signaling. The data block structures, and/or the corresponding blocks and/or signaling, may be scheduled for simultaneous transmission, e.g. for the same transmission timing structure, in particular within the same slot or subframe, and/or on the same symbol/s. However, alternatives with scheduling for non-simultaneous transmission may be considered. For example, the acknowledgment information may pertain to data blocks scheduled for different transmission timing structures, e.g. different slots (or mini-slots, or slots and mini-slots) or similar, which may correspondingly be received (or not or wrongly received). Scheduling signaling may generally comprise indicating resources, e.g. time and/or frequency resources, for example for receiving or transmitting the scheduled signaling.

Signaling may generally be considered to represent an electromagnetic wave structure (e.g., over a time interval and frequency interval), which is intended to convey information to at least one specific or generic (e.g., anyone who might pick up the signaling) target. A process of signaling may comprise transmitting the signaling. Transmitting signaling, in particular control signaling or communication signaling, e.g. comprising or representing acknowledgement signaling and/or resource requesting information, may comprise encoding and/or modulating. Encoding and/or modulating may comprise error detection coding and/or forward error correction encoding and/or scrambling. Receiving control signaling may comprise corresponding decoding and/or demodulation. Error detection coding may comprise, and/or be based on, parity or checksum approaches, e.g. CRC (Cyclic Redundancy Check). Forward error correction coding may comprise and/or be based on for example turbo coding and/or Reed-Muller coding, and/or polar coding and/or LDPC coding (Low Density Parity Check). The type of coding used may be based on the channel (e.g., physical channel) the coded signal is associated to. A code rate may represent the ratio of the number of information bits before encoding to the number of encoded bits after encoding, considering that encoding adds coding bits for error detection coding and forward error correction. Coded bits may refer to information bits (also called systematic bits) plus coding bits.

Communication signaling may comprise, and/or represent, and/or be implemented as, data signaling, and/or user plane signaling. Communication signaling may be associated to a data channel, e.g. a physical downlink channel or physical uplink channel or physical sidelink channel, in particular a PDSCH (Physical Downlink Shared Channel) or PSSCH (Physical Sidelink Shared Channel). Generally, a data channel may be a shared channel or a dedicated channel. Data signaling may be signaling associated to and/or on a data channel.

An indication generally may explicitly and/or implicitly indicate the information it represents and/or indicates.

Implicit indication may for example be based on position and/or resource used for transmission. Explicit indication may for example be based on a parametrisation with one or more parameters, and/or one or more index or indices, and/or one or more bit patterns representing the information. It may in particular be considered that control signaling as described herein, based on the utilised resource sequence, implicitly indicates the control signaling type.

A resource element may generally describe the smallest individually usable and/or encodable and/or decodable and/or modulatable and/or demodulatable time-frequency resource, and/or may describe a time-frequency resource covering a symbol time length in time and a subcarrier in frequency. A signal may be allocatable and/or allocated to a resource element. A subcarrier may be a subband of a carrier, e.g. as defined by a standard. A carrier may define a frequency and/or frequency band for transmission and/or reception. In some variants, a signal (jointly encoded/modulated) may cover more than one resource elements. A resource element may generally be as defined by a corresponding standard, e.g. NR or LTE. As symbol time length and/or subcarrier spacing (and/or numerology) may be different between different symbols and/or subcarriers, different resource elements may have different extension (length/width) in time and/or frequency domain, in particular resource elements pertaining to different carriers.

A resource generally may represent a time-frequency and/or code resource, on which signaling, e.g. according to a specific format, may be communicated, for example transmitted and/or received, and/or be intended for transmission and/or reception.

A border symbol (or allocation unit) may generally represent a starting symbol (allocation unit) or an ending symbol (allocation unit) for transmitting and/or receiving. A starting symbol (or allocation unit) may in particular be a starting symbol of uplink or sidelink signaling, for example control signaling or data signaling. Such signaling may be on a data channel or control channel, e.g. a physical channel, in particular a physical uplink shared channel (like PUSCH) or a sidelink data or shared channel, or a physical uplink control channel (like PUCCH) or a sidelink control channel. If the starting symbol (or allocation unit) is associated to control signaling (e.g., on a control channel), the control signaling may be in response to received signaling (in sidelink or downlink), e.g. representing acknowledgement signaling associated thereto, which may be HARQ or ARQ signaling. An ending symbol (or allocation unit) may represent an ending symbol (in time) of downlink or sidelink transmission or signaling, which may be intended or scheduled for the radio node or user equipment. Such downlink signaling may in particular be data signaling, e.g. on a physical downlink channel like a shared channel, e.g. a PDSCH (Physical Downlink Shared Channel). A starting symbol (or allocation unit) may be determined based on, and/or in relation to, such an ending symbol (or allocation unit).

Configuring a radio node, in particular a terminal or user equipment, may refer to the radio node being adapted or caused or set and/or instructed to operate according to the configuration. Configuring may be done by another device, e.g., a network node (for example, a radio node of the network like a base station or eNodeB) or network, in which case it may comprise transmitting configuration data to the radio node to be configured. Such configuration data may represent the configuration to be configured and/or comprise one or more instruction pertaining to a configuration, e.g. a configuration for transmitting and/or receiving on allocated resources, in particular frequency resources. A radio node may configure itself, e.g., based on configuration data received from a network or network node. A network node may utilise, and/or be adapted to utilise, its circuitry/ies for configuring. Allocation information may be considered a form of configuration data. Configuration data may comprise and/or be represented by configuration information, and/or one or more corresponding indications and/or message/s Generally, configuring may include determining configuration data representing the configuration and providing, e.g. transmitting, it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal may comprise scheduling downlink and/or uplink transmissions for the terminal, e.g. downlink data and/or downlink control signaling and/or DCI and/or uplink control or data or communication signaling, in particular acknowledgement signaling, and/or configuring resources and/or a resource pool therefor.

A resource structure may be considered to be neighbored in frequency domain by another resource structure, if they share a common border frequency, e.g. one as an upper frequency border and the other as a lower frequency border. Such a border may for example be represented by the upper end of a bandwidth assigned to a subcarrier n, which also represents the lower end of a bandwidth assigned to a subcarrier n+1. A resource structure may be considered to be neighbored in time domain by another resource structure, if they share a common border time, e.g. one as an upper (or right in the figures) border and the other as a lower (or left in the figures) border. Such a border may for example be represented by the end of the symbol time interval assigned to a symbol n, which also represents the beginning of a symbol time interval assigned to a symbol n+1.

Generally, a resource structure being neighbored by another resource structure in a domain may also be referred to as abutting and/or bordering the other resource structure in the domain.

A resource structure may in general represent a structure in time and/or frequency domain, in particular representing a time interval and a frequency interval. A resource structure may comprise and/or be comprised of resource elements, and/or the time interval of a resource structure may comprise and/or be comprised of symbol time interval/s, and/or the frequency interval of a resource structure may comprise and/or be comprised of subcarrier/s. A resource element may be considered an example for a resource structure, a slot or mini-slot or a Physical Resource Block (PRB) or parts thereof may be considered others. A resource structure may be associated to a specific channel, e.g. a PUSCH or PUCCH, in particular resource structure smaller than a slot or PRB.

Examples of a resource structure in frequency domain comprise a bandwidth or band, or a bandwidth part. A bandwidth part may be a part of a bandwidth available for a radio node for communicating, e.g. due to circuitry and/or configuration and/or regulations and/or a standard. A bandwidth part may be configured or configurable to a radio node. In some variants, a bandwidth part may be the part of a bandwidth used for communicating, e.g. transmitting and/or receiving, by a radio node. The bandwidth part may be smaller than the bandwidth (which may be a device bandwidth defined by the circuitry/configuration of a device, and/or a system bandwidth, e.g. available for a RAN). It may be considered that a bandwidth part comprises one or more resource blocks or resource block groups, in particular one or more PRBs or PRB groups. A bandwidth part may pertain to, and/or comprise, one or more carriers. A resource structure may in time domain comprise and/or represent a time interval, e.g. one of more allocation units and/or symbols and/or slots and/or subframes. In general, any reference to a symbol as a time interval may be considered as a reference to an allocation unit as a more general term, unless the reference to the symbol is specific, e.g. referring to a specific division or modulation technique, or to modulation symbols as transmission structures.

A carrier may generally represent a frequency range or band and/or pertain to a central frequency and an associated frequency interval. It may be considered that a carrier comprises a plurality of subcarriers. A carrier may have assigned to it a central frequency or center frequency interval, e.g. represented by one or more subcarriers (to each subcarrier there may be generally assigned a frequency bandwidth or interval). Different carriers may be non-overlapping, and/or may be neighboring in frequency domain.

It should be noted that the term "radio" in this disclosure may be considered to pertain to wireless communication in general, and may also include wireless communication utilising millimeter waves, in particular above one of the thresholds 10 GHz or 20 GHz or 50 GHz or 52 GHz or 52.6 GHz or 60 GHz or 72 GHz or 100 GHz or 114 GHz. Such communication may utilise one or more carriers, e.g. in FDD and/or carrier aggregation. Upper frequency boundaries may correspond to 300 GHz or 200 GHz or 120 GHz or any of the thresholds larger than the one representing the lower frequency boundary.

A radio node, in particular a network node or a terminal, may generally be any device adapted for transmitting and/or receiving radio and/or wireless signals and/or data, in particular communication data, in particular on at least one carrier. The at least one carrier may comprise a carrier accessed based on an LBT procedure (which may be called LBT carrier), e.g., an unlicensed carrier. It may be considered that the carrier is part of a carrier aggregate.

Receiving or transmitting on a cell or carrier may refer to receiving or transmitting utilizing a frequency (band) or spectrum associated to the cell or carrier. A cell may generally comprise and/or be defined by or for one or more carriers, in particular at least one carrier for UL communication/transmission (called UL carrier) and at least one carrier for DL communication/transmission (called DL carrier). It may be considered that a cell comprises different numbers of UL carriers and DL carriers. Alternatively, or additionally, a cell may comprise at least one carrier for UL communication/transmission and DL communication/transmission, e.g., in TDD-based approaches.

A channel may generally be a logical, transport or physical channel. A channel may comprise and/or be arranged on one or more carriers, in particular a plurality of subcarriers. A channel carrying and/or for carrying control signaling/control information may be considered a control channel, in particular if it is a physical layer channel and/or if it carries control plane information. Analogously, a channel carrying and/or for carrying data signaling/user information may be considered a data channel, in particular if it is a physical layer channel and/or if it carries user plane information. A channel may be defined for a specific communication direction, or for two complementary communication directions (e.g., UL and DL, or sidelink in two directions), in which case it may be considered to have two component channels, one for each direction. Examples of channels comprise a channel for low latency and/or high reliability transmission, in particular a channel for Ultra-Reliable Low Latency Communication (URLLC), which may be for control and/or data.

In general, a symbol may represent and/or be associated to a symbol time length, which may be dependent on the carrier and/or subcarrier spacing and/or numerology of the associated carrier. Accordingly, a symbol may be considered to indicate a time interval having a symbol time length in relation to frequency domain. A symbol time length may be dependent on a carrier frequency and/or bandwidth and/or numerology and/or subcarrier spacing of, or associated to, a symbol. Accordingly, different symbols may have different symbol time lengths. In particular, numerologies with different subcarrier spacings may have different symbol time length. Generally, a symbol time length may be based on, and/or include, a guard time interval or cyclic extension, e.g. prefix or postfix.

A sidelink may generally represent a communication channel (or channel structure) between two UEs and/or terminals, in which data is transmitted between the participants (UEs and/or terminals) via the communication channel, e.g. directly and/or without being relayed via a network node. A sidelink may be established only and/or directly via air interface/s of the participant, which may be directly linked via the sidelink communication channel. In some variants, sidelink communication may be performed without interaction by a network node, e.g. on fixedly defined resources and/or on resources negotiated between the participants. Alternatively, or additionally, it may be considered that a network node provides some control functionality, e.g. by configuring resources, in particular one or more resource pool/s, for sidelink communication, and/or monitoring a sidelink, e.g. for charging purposes.

Sidelink communication may also be referred to as device-to-device (D2D) communication, and/or in some cases as ProSe (Proximity Services) communication, e.g. in the context of LTE. A sidelink may be implemented in the context of V2x communication (Vehicular communication), e.g. V2V (Vehicle-to-Vehicle), V2I (Vehicle-to-Infrastructure) and/or V2P (Vehicle-to-Person). Any device adapted for sidelink communication may be considered a user equipment or terminal.

A sidelink communication channel (or structure) may comprise one or more (e.g., physical or logical) channels, e.g. a PSCCH (Physical Sidelink Control CHannel, which may for example carry control information like an acknowledgement position indication, and/or a PSSCH (Physical Sidelink Shared CHannel, which for example may carry data and/or acknowledgement signaling). It may be considered that a sidelink communication channel (or structure) pertains to and/or used one or more carrier/s and/or frequency range/s associated to, and/or being used by, cellular communication, e.g. according to a specific license and/or standard. Participants may share a (physical) channel and/or resources, in particular in frequency domain and/or related to a frequency resource like a carrier) of a sidelink, such that two or more participants transmit thereon, e.g. simultaneously, and/or time-shifted, and/or there may be associated specific channels and/or resources to specific participants, so that for example only one participant transmits on a specific channel or on a specific resource or specific resources, e.g., in frequency domain and/or related to one or more carriers or subcarriers.

A sidelink may comply with, and/or be implemented according to, a specific standard, e.g. an LTE-based standard and/or NR. A sidelink may utilise TDD (Time Division Duplex) and/or FDD (Frequency Division Duplex) technology, e.g. as configured by a network node, and/or preconfigured and/or negotiated between the participants. A user equipment may be considered to be adapted for sidelink communication if it, and/or its radio circuitry and/or processing circuitry, is adapted for utilising a sidelink, e.g. on one or more frequency ranges and/or carriers and/or in one or more formats, in particular according to a specific standard. It may be generally considered that a Radio Access Network is defined by two participants of a sidelink communication. Alternatively, or additionally, a Radio Access Network may be represented, and/or defined with, and/or be related to a network node and/or communication with such a node.

Communication or communicating may generally comprise transmitting and/or receiving signaling. Communication on a sidelink (or sidelink signaling) may comprise utilising the sidelink for communication (respectively, for signaling). Sidelink transmission and/or transmitting on a sidelink may be considered to comprise transmission utilising the sidelink, e.g. associated resources and/or transmission formats and/or circuitry and/or the air interface. Sidelink reception and/or receiving on a sidelink may be considered to comprise reception utilising the sidelink, e.g. associated resources and/or transmission formats and/or circuitry and/or the air interface. Sidelink control information (e.g., SCI) may generally be considered to comprise control information transmitted utilising a sidelink.

Generally, carrier aggregation (CA) may refer to the concept of a radio connection and/or communication link between a wireless and/or cellular communication network and/or network node and a terminal or on a sidelink comprising a plurality of carriers for at least one direction of transmission (e.g. DL and/or UL), as well as to the aggregate of carriers. A corresponding communication link may be referred to as carrier aggregated communication link or CA communication link; carriers in a carrier aggregate may be referred to as component carriers (CC). In such a link, data may be transmitted over more than one of the carriers and/or all the carriers of the carrier aggregation (the aggregate of carriers). A carrier aggregation may comprise one (or more) dedicated control carriers and/or primary carriers (which may e.g. be referred to as primary component carrier or PCC), over which control information may be transmitted, wherein the control information may refer to the primary carrier and other carriers, which may be referred to as secondary carriers (or secondary component carrier, SCC). However, in some approaches, control information may be sent over more than one carrier of an aggregate, e.g. one or more PCCs and one PCC and one or more SCCs.

A transmission may generally pertain to a specific channel and/or specific resources, in particular with a starting symbol and ending symbol in time, covering the interval therebetween. A scheduled transmission may be a transmission scheduled and/or expected and/or for which resources are scheduled or provided or reserved. However, not every scheduled transmission has to be realized. For example, a scheduled downlink transmission may not be received, or a scheduled uplink transmission may not be transmitted due to power limitations, or other influences (e.g., a channel on an unlicensed carrier being occupied). A transmission may be scheduled for a transmission timing substructure (e.g., a mini-slot, and/or covering only a part of a transmission timing structure) within a transmission timing structure like a slot. A border symbol may be indicative of a symbol in the transmission timing structure at which the transmission starts or ends.

Predefined in the context of this disclosure may refer to the related information being defined for example in a standard, and/or being available without specific configuration from a network or network node, e.g. stored in memory, for example independent of being configured. Configured or configurable may be considered to pertain to the corresponding information being set/configured, e.g. by the network or a network node.

A configuration or schedule, like a mini-slot configuration and/or structure configuration, may schedule transmissions, e.g. for the time/transmissions it is valid, and/or transmissions may be scheduled by separate signaling or separate configuration, e.g. separate RRC signaling and/or downlink control information signaling. The transmission/s scheduled may represent signaling to be transmitted by the device for which it is scheduled, or signaling to be received by the device for which it is scheduled, depending on which side of a communication the device is. It should be noted that downlink control information or specifically DCI signaling may be considered physical layer signaling, in contrast to higher layer signaling like MAC (Medium Access Control) signaling or RRC layer signaling. The higher the layer of signaling is, the less frequent/the more time/resource consuming it may be considered, at least partially due to the information contained in such signaling having to be passed on through several layers, each layer requiring processing and handling.

A scheduled transmission, and/or transmission timing structure like a mini-slot or slot, may pertain to a specific channel, in particular a physical uplink shared channel, a physical uplink control channel, or a physical downlink shared channel, e.g. PUSCH, PUCCH or PDSCH, and/or may pertain to a specific cell and/or carrier aggregation. A corresponding configuration, e.g. scheduling configuration or symbol configuration may pertain to such channel, cell and/or carrier aggregation. It may be considered that the scheduled transmission represents transmission on a physical channel, in particular a shared physical channel, for example a physical uplink shared channel or physical downlink shared channel. For such channels, semi-persistent configuring may be particularly suitable.

Generally, a configuration may be a configuration indicating timing, and/or be represented or configured with corresponding configuration data. A configuration may be embedded in, and/or comprised in, a message or configuration or corresponding data, which may indicate and/or schedule resources, in particular semi-persistently and/or semi-statically.

A control region of a transmission timing structure may be an interval in time and/or frequency domain for intended or scheduled or reserved for control signaling, in particular downlink control signaling, and/or for a specific control channel, e.g. a physical downlink control channel like PDCCH. The interval may comprise, and/or consist of, a number of symbols in time, which may be configured or configurable, e.g. by (UE-specific) dedicated signaling (which may be single-cast, for example addressed to or intended for a specific UE), e.g. on a PDCCH, or RRC signaling, or on a multicast or broadcast channel. In general, the transmission timing structure may comprise a control region covering a configurable number of symbols. It may be considered that in general the border symbol is configured to be after the control region in time. A control region may be associated, e.g. via configuration and/or determination, to one or more specific UEs and/or formats of PDCCH and/or DCI and/or identifiers, e.g. UE identifiers and/or RNTIs or carrier/cell identifiers, and/or be represented and/or associated to a CORESET and/or a search space.

The duration of a symbol (symbol time length or interval or allocation unit) of the transmission timing structure may generally be dependent on a numerology and/or carrier, wherein the numerology and/or carrier may be configurable. The numerology may be the numerology to be used for the scheduled transmission.

A transmission timing structure may comprise a plurality of allocation units or symbols, and/or define an interval comprising several symbols or allocation units (respectively their associated time intervals). In the context of this disclosure, it should be noted that a reference to a symbol for ease of reference may be interpreted to refer to the time domain projection or time interval or time component or duration or length in time of the symbol, unless it is clear from the context that the frequency domain component also has to be considered. Examples of transmission timing structures include slot, subframe, mini-slot (which also may be considered a substructure of a slot), slot aggregation (which may comprise a plurality of slots and may be considered a superstructure of a slot), respectively their time domain component. A transmission timing structure may generally comprise a plurality of symbols and/or allocation units defining the time domain extension (e.g., interval or length or duration) of the transmission timing structure, and arranged neighboring to each other in a numbered sequence. A timing structure (which may also be considered or implemented as synchronisation structure) may be defined by a succession of such transmission timing structures, which may for example define a timing grid with symbols representing the smallest grid structures. A transmission timing structure, and/or a border symbol or a scheduled transmission may be determined or scheduled in relation to such a timing grid. A transmission timing structure of reception may be the transmission timing structure in which the scheduling control signaling is received, e.g. in relation to the timing grid. A transmission timing structure may in particular be a slot or subframe or in some cases, a mini-slot. In some cases, a timing structure may be represented by a frame structure. Timing structures may be associated to specific transmitters and/or cells and/or beams and/or signalings.

Feedback signaling may be considered a form or control signaling, e.g. uplink or sidelink control signaling, like UCI (Uplink Control Information) signaling or SCI (Sidelink Control Information) signaling. Feedback signaling may in particular comprise and/or represent acknowledgement signaling and/or acknowledgement information and/or measurement reporting.

Signaling utilising, and/or on and/or associated to, resources or a resource structure may be signaling covering the resources or structure, signaling on the associated frequency/ies and/or in the associated time interval/s. It may be considered that a signaling resource structure comprises and/or encompasses one or more substructures, which may be associated to one or more different channels and/or types of signaling and/or comprise one or more holes (resource element/s not scheduled for transmissions or reception of transmissions). A resource substructure, e.g. a feedback resource structure, may generally be continuous in time and/or frequency, within the associated intervals. It may be considered that a substructure, in particular a feedback resource structure, represents a rectangle filled with one or more resource elements in time/frequency space. However, in some cases, a resource structure or substructure, in particular a frequency resource range, may represent a non-continuous pattern of resources in one or more domains, e.g. time and/or frequency. The resource elements of a substructure may be scheduled for associated signaling.

Example types of signaling comprise signaling of a specific communication direction, in particular, uplink signaling, downlink signaling, sidelink signaling, as well as reference signaling (e.g., SRS or CRS or CSI-RS), communication signaling, control signaling, and/or signaling associated to a specific channel like PUSCH, PDSCH, PUCCH, PDCCH, PSCCH, PSSCH, etc.).

In some cases, a shifting object like a signaling or signals or sequences or information may be shifted, e.g. relative to a predecessor (e.g., one is subject to a shift, and the shifted version is used), or relative to another (e.g., one associated to one signaling or allocation unit may be shifted to another associated to a second signaling or allocation unit, both may be used). One possible way of shifting is operating a code on it, e.g. to multiply each element of a shifting object with a factor. A ramping (e.g. multiplying with a monotonously increasing or periodic factor) may be considered an example of shifting. Another is a cyclic shift in a domain or interval. A cyclic shift (or circular shift) may correspond to a rearrangement of the elements in the shifting object, corresponding to moving the final element or elements to the first position, while shifting all other entries to the next position, or by performing the inverse operation (such that the shifted object as the result will have the same elements as the shifting object, in a shifted but similar order). Shifting in general may be specific to an interval in a domain, e.g. an allocation unit in time domain, or a bandwidth in frequency domain. For example, it may be considered that signals or modulation symbols in an allocation unit are shifted, such that the order of the modulation symbols or signals is shifted in the allocation unit. In another example, allocation units may be shifted, e.g. in a larger time interval—this may leave signals in the allocation units unshifted with reference to the individual allocation unit, but may change the order of the allocation units. Domains for shifting may for example be time domain and/or phase domain and/or frequency domain. Multiple shifts in the same domain or different domains, and/or the same interval or different intervals (differently sized intervals, for example) may be performed.

Synchronisation signaling may be provided by a transmitting (radio) node, e.g. a network node, to allow a receiving (radio) node like a user equipment to identify a cell and/or transmitter, and/or to synchronise to the transmitter and/or cell, and/or to provide information regarding the transmitter and/or cell. Synchronisation signaling may in general comprise one or more components (e.g., different types of signaling), e.g. primary synchronisation signaling (PSS) and/or secondary synchronisation signaling (SSS) and/or broadcast signaling and/or system information (e.g., on a Physical Broadcast Channel). System information (SI) may for example comprise a Master Information Block (MIB) and/or one or more System Information Blocks (SIBs), e.g. at least a SIB1. The different components may be transmitted in a block, e.g. neighbouring in time and/or frequency domain. PSS may indicate a transmitter and/or cell identity, e.g. a group of cell and/or transmitter identities the cell belongs to. The SSS may indicate which cell and/or transmitter of the group the cell and/or transmitter the transmitter is associated to and/or represented by (it may be considered that more than one transmitters are associated to the same ID, e.g. in the same cell and/or in a multiple transmission point scenario). PSS may indicate a rougher timing (larger granularity) than the SSS; synchronisation may be based on evaluating PSS and SSS, e.g. in sequence and/or step-wise from a first (rougher) timing to a second (finer) timing. Synchronisation signaling, e.g. PSS and/or SSS, and/or SI may indicate a beam (e.g., beam ID and/or number) and/or beam timing of a beam used for transmitting the synchronisation signaling. Synchronisation signaling may be in form of a SS/PBCH block and/or SSB. It may be considered that synchronisation signaling is transmitted periodically, e.g. every NP ms, e.g. NP=20, 40 or 80. In some cases, synchronisation signaling may be transmitted in bursts, e.g. such that signaling is repeated over more than one synchronisation time interval (e.g., neighboring time intervals, or with gaps between them); a burst may be associated to a burst interval, e.g. within a slot and/or frame and/or a number of NB allocation units, wherein NB may be 100 or less, or 50 or less, or 40 or less or 20 or less. In some cases, a synchronisation time interval may comprise NS allocation units carrying signaling (e.g., PSS and/or SSS and/or PBCH or SI); it may be considered that a burst interval comprises P1 (P1>=1) occasions (thus, P1−1 repetitions) of the synchronisation signaling, and/or comprises at least P1×NS allocation units in time domain; it may be larger than P1×NS units, e.g. to allow for gaps between individual occasions and/or one or more guard interval/s. In some variants, it may comprise at least (P1+1)×NS allocation units, or (P1+2)×NS allocation units, e.g. including gaps between occasions. The synchronisation signaling may be transmitted on, and/or be associated to, a synchronisation bandwidth in frequency space, which may be predefined and/or configured or configurable (e.g., for a receiving node). The synchronisation bandwidth may for example be 100 MHz and/or 500 MHz, or 250 MHz, or another value. A synchronisation bandwidth may be associated to and/or be arranged within a carrier and/or a communication frequency interval. It may be considered that for each carrier and/or frequency interval, there are one or more possible location of a synchronisation bandwidth. PSS and/or SSS may be considered physical layer signaling representing information without having coding (e.g., error coding). Broadcast signaling, e.g. on a PBCH may be coded, in particular comprises error coding like error correction coding, e.g. a CRC.

In the context of this disclosure, there may be distinguished between dynamically scheduled or aperiodic transmission and/or configuration, and semi-static or semi-persistent or periodic transmission and/or configuration. The term "dynamic" or similar terms may generally pertain to configuration/transmission valid and/or scheduled and/or configured for (relatively) short timescales and/or a (e.g., predefined and/or configured and/or limited and/or definite) number of occurrences and/or transmission timing structures, e.g. one or more transmission timing structures like slots or slot aggregations, and/or for one or more (e.g., specific number) of transmission/occurrences. Dynamic configuration may be based on low-level signaling, e.g. control signaling on the physical layer and/or MAC layer, in particular in the form of DCI or SCI. Periodic/semi-static may pertain to longer timescales, e.g. several slots and/or more than one frame, and/or a non-defined number of occurrences, e.g., until a dynamic configuration contradicts, or until a new periodic configuration arrives. A periodic or semi-static configuration may be based on, and/or be configured with, higher-layer signaling, in particular RLC layer signaling and/or RRC signaling and/or MAC signaling.

In this disclosure, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other variants and variants that depart from these specific details.

For example, the concepts and variants are partially described in the context of Long Term Evolution (LTE) or LTE-Advanced (LTE-A) or New Radio mobile or wireless communications technologies; however, this does not rule out the use of the present concepts and aspects in connection with additional or alternative mobile communication technologies such as the Global System for Mobile Communications (GSM) or IEEE standards as IEEE 802.11ad or IEEE 802.11 ay. While described variants may pertain to certain Technical Specifications (TSs) of the Third Generation Partnership Project (3GPP), it will be appreciated that the present approaches, concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the variants described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. The aspects presented herein can be varied in many ways.

Some useful abbreviations comprise

Abbreviation Explanation

ACK/NACK Acknowledgment/Negative Acknowledgement
ARQ Automatic Repeat reQuest
BER Bit Error Rate
BLER Block Error Rate
BPSK Binary Phase Shift Keying
BWP BandWidth Part
CAZAC Constant Amplitude Zero Cross Correlation
CB Code Block
CBG Code Block Group
CDM Code Division Multiplex
CM Cubic Metric
CORESET Control Resource Set
CQI Channel Quality Information
CRC Cyclic Redundancy Check CRS Common reference signal
CSI Channel State Information
CSI-RS Channel state information reference signal
DAI Downlink Assignment Indicator
DCI Downlink Control Information
DFT Discrete Fourier Transform
DFTS-FDM DFT-spread-FDM
DM(-)RS Demodulation reference signal(ing)
eMBB enhanced Mobile BroadBand
FDD Frequency Division Duplex
FDE Frequency Domain Equalisation
FDF Frequency Domain Filtering
FDM Frequency Division Multiplex
HARQ Hybrid Automatic Repeat Request
IAB Integrated Access and Backhaul
IFFT Inverse Fast Fourier Transform
IR Impulse Response
ISI Inter Symbol Interference
MBB Mobile Broadband
MCS Modulation and Coding Scheme
MIMO Multiple-input-multiple-output
MRC Maximum-ratio combining
MRT Maximum-ratio transmission
MU-MIMO Multiuser multiple-input-multiple-output
OFDM/A Orthogonal Frequency Division Multiplex/Multiple Access
PAPR Peak to Average Power Ratio
PDCCH Physical Downlink Control Channel
PDSCH Physical Downlink Shared Channel
PRACH Physical Random Access CHannel
PRB Physical Resource Block
PUCCH Physical Uplink Control Channel
PUSCH Physical Uplink Shared Channel
(P)SCCH (Physical) Sidelink Control Channel
PSS Primary Synchronisation Signal(ing)
(P)SSCH (Physical) Sidelink Shared Channel
QAM Quadrature Amplitude Modulation
OCC Orthogonal Cover Code
QPSK Quadrature Phase Shift Keying
PSD Power Spectral Density
RAN Radio Access Network
RAT Radio Access Technology
RB Resource Block
RNTI Radio Network Temporary Identifier
RRC Radio Resource Control
RX Receiver, Reception, Reception-related/side
SA Scheduling Assignment
SC-FDE Single Carrier Frequency Domain Equalisation
SC-FDM/A Single Carrier Frequency Division Multiplex/Multiple Access
SCI Sidelink Control Information
SINR Signal-to-interference-plus-noise ratio
SIR Signal-to-interference ratio
SNR Signal-to-noise-ratio
SR Scheduling Request
SRS Sounding Reference Signal(ing)
SSS Secondary Synchronisation Signal(ing)
SVD Singular-value decomposition
TB Transport Block
TDD Time Division Duplex
TDM Time Division Multiplex
TX Transmitter, Transmission, Transmission-related/side
UCI Uplink Control Information
UE User Equipment
URLLC Ultra Low Latency High Reliability Communication
VL-MIMO Very-large multiple-input-multiple-output
ZF Zero Forcing
ZP Zero-Power, e.g. muted CSI-RS symbol Abbreviations may be considered to follow 3GPP usage if applicable.

The invention claimed is:

1. A method of operating a transmitting radio node in a wireless communication network, the method comprising: transmitting first control signaling covering one or more first allocation units in a control transmission time interval, and transmitting second control signaling covering one or more second allocation units in the control transmission time interval, the second control signaling being shifted relative to the first control signaling based on a complex conjugation operation, the second control signaling overlapping in one or both a time and a frequency domain with the first control signaling.

2. A transmitting radio node for a wireless communication network, the transmitting radio node configured to: transmit first control signaling covering one or more first allocation units in a control transmission time interval, and transmitting second control signaling covering one or more second allocation units in the control transmission time interval, the second control signaling being shifted relative to the first control signaling based on a complex conjugation operation, the second control signaling overlapping in one or both a time and a frequency domain with the first control signaling.

3. A method of operating a receiving radio node in a wireless communication network, the method comprising: communicating based on received control signaling, the control signaling comprising first control signaling covering one or more first allocation units in a control transmission time interval, the control signaling further comprising second control signaling covering one or more second allocation units in the control transmission time interval, the second control signaling being shifted relative to the first control signaling based on a complex conjugation operation, the second control signaling overlapping in one or both a time and a frequency domain with the first control signaling.

4. A receiving radio node for a wireless communication network, the receiving radio node configured to: communicate based on received control signaling, the control signaling comprising first control signaling covering one or more first allocation units in a control transmission time interval, the control signaling further comprising second control signaling covering one or more second allocation units in the control transmission time interval, the second control signaling being shifted relative to the first control signaling based on a complex conjugation operation, the second control signaling overlapping in one or both a time and a frequency domain with the first control signaling.

5. The method according to claim 1, wherein one or both of the first control signaling and the second control signaling is signaling on one or both of a physical control channel and a physical broadcast channel.

6. The method according to claim 1, wherein the first control signaling and the second control signaling represent one or both of the same information content and payload.

7. The method according to claim 1, wherein the first control signaling comprises first reference signaling, and the second control signaling comprises second reference signaling, wherein the second control signaling is shifted relative to the first control signaling at least such that the second reference signaling is shifted relative to the first reference signaling.

8. The method according to claim 1, wherein one or both of the first control signaling and the second control signaling are associated to first synchronisation signaling.

9. The method according to claim 1, wherein the first control signaling and the second control signaling are synchronised to each other.

10. The method according to claim 1, wherein the second control signaling is shifted relative to the first control signaling by having one or both of a different mapping of bits and modulation symbols to resources.

11. The method according to claim 1, wherein the second control signaling is shifted relative to the first control signaling by one or more of:
being scrambled by a different scrambling code;
being subject to a different interleaving function;
being subject to a different cyclic shift;
representing a different redundancy version of encoded bits;
being subject to different scrambling of error coding;
based on time domain interleaving; and
frequency domain interleaving.

12. The method according to claim 1, wherein the second control signaling has a different transmission source than the first control signaling.

13. A non-transitory computer storage medium storing a computer program comprising instructions causing processing circuitry to one or both control and perform a method, the method comprising:
transmitting first control signaling covering one or more first allocation units in a control transmission time interval, and transmitting second control signaling covering one or more second allocation units in the control transmission time interval, the second control signaling being shifted relative to the first control signaling based on a complex conjugation operation, the second control signaling overlapping in one or both a time and a frequency domain with the first control signaling.

14. The method according to claim 3, wherein one or both of the first control signaling and the second control signaling is signaling on one or both of a physical control channel and a physical broadcast channel.

15. The method according to claim 3, wherein the first control signaling and the second control signaling represent one or both of the same information content and payload.

16. The method according to claim 3, wherein the first control signaling comprises first reference signaling, and the second control signaling comprises second reference signaling, wherein the second control signaling is shifted relative to the first control signaling at least such that the second reference signaling is shifted relative to the first reference signaling.

17. The method according to claim 3, wherein one or both of the first control signaling and the second control signaling are associated to first synchronisation signaling.

18. The method according to claim 3, wherein the first control signaling and the second control signaling are synchronised to each other.

19. The method according to claim 3, wherein the second control signaling overlaps in one or both a time and a frequency domain with the first control signaling.

* * * * *